US012612725B2

(12) United States Patent
An et al.

(10) Patent No.: US 12,612,725 B2
(45) Date of Patent: Apr. 28, 2026

(54) LAUNDRY TREATMENT APPARATUS

(71) Applicant: LG ELECTRONICS INC., Seoul (KR)

(72) Inventors: Jaecheon An, Seoul (KR); Yongjun An, Seoul (KR); Donghyun Jin, Seoul (KR); Sanghun Kim, Seoul (KR); Juhan Yoon, Seoul (KR); Jun Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 1117 days.

(21) Appl. No.: 17/667,003

(22) Filed: Feb. 8, 2022

(65) Prior Publication Data

US 2022/0251763 A1 Aug. 11, 2022

(30) Foreign Application Priority Data

Feb. 8, 2021 (KR) ........................ 10-2021-0017343
Feb. 23, 2021 (KR) ........................ 10-2021-0024267

(51) Int. Cl.
    *D06F 58/08* (2006.01)
    *D06F 37/04* (2006.01)
    (Continued)

(52) U.S. Cl.
    CPC .............. *D06F 58/08* (2013.01); *D06F 37/04* (2013.01); *D06F 37/30* (2013.01); *H02K 7/003* (2013.01); *F16C 3/02* (2013.01); *F16D 1/06* (2013.01)

(58) Field of Classification Search
    CPC .......... D06F 58/08; D06F 37/04; D06F 37/30; D06F 58/06; H02K 7/003; F16C 3/02; F16D 1/06
    See application file for complete search history.

(56) References Cited

U.S. PATENT DOCUMENTS

| | | | |
|---|---|---|---|
| 5,463,883 | A | 11/1995 | Pellerin et al. |
| 5,927,106 | A | 7/1999 | Pellerin |
| 2019/0264377 | A1 | 8/2019 | Choi et al. |

FOREIGN PATENT DOCUMENTS

| | | |
|---|---|---|
| CA | 2412296 | 5/2004 |
| CA | 2412296 A1 * | 5/2004 |

(Continued)

OTHER PUBLICATIONS

Office Action in Chinese Appln. No. 202210118382.2, mailed on Sep. 30, 2023, 17 pages (with English translation).

(Continued)

*Primary Examiner* — Jessica Yuen
(74) *Attorney, Agent, or Firm* — Fish & Richardson P.C.

(57) ABSTRACT

A laundry treatment apparatus includes: a drive unit including a rotating shaft, a drum configured to be rotated by the rotating shaft and receive laundry and including a cylindrical drum body and a rear cover, the rear cover defining a rear surface of the drum body and a rear cover through hole in an axial direction of the rotating shaft, and a shaft bracket that (i) is coupled to the rear cover and the rotating shaft, (ii) covers the rear cover through hole, (iii) is configured to transmit rotational force of the rotating shaft to the drum, and (iv) defines a shaft-coupling hole in the axial direction. The rotating shaft is inserted into the shaft-coupling hole, projected into an inside of the drum, and coupled to the shaft bracket by a rotating-shaft-fastening member.

19 Claims, 15 Drawing Sheets

(51) Int. Cl.

| | | |
|---|---|---|
| *D06F 37/30* | (2020.01) |
| *F16C 3/02* | (2006.01) |
| *F16D 1/06* | (2006.01) |
| *H02K 7/00* | (2006.01) |

(56) References Cited

FOREIGN PATENT DOCUMENTS

| CN | 1580378 | 2/2005 |
|---|---|---|
| CN | 103668911 | 3/2014 |
| CN | 206752142 U | 12/2017 |
| CN | 108431324 | 8/2018 |
| CN | 110088377 | 8/2019 |
| CN | 112088231 | 12/2020 |
| EP | 3158120 | 4/2017 |
| JP | 2012-081159 A | 4/2012 |
| JP | 2013111276 | 6/2013 |
| KR | 20040105862 | 12/2004 |
| KR | 10-0748169 | 8/2007 |
| KR | 20100045316 | 5/2010 |
| KR | 10-2010-0129150 A | 12/2010 |
| KR | 20200066169 | 6/2020 |

OTHER PUBLICATIONS

Office Action in Chinese Appln. No. 202210118382.2, mailed on May 17, 2024, 18 pages (with English translation).

Extended European Search Report in European Appln. No. 22155584.0, dated Jul. 12, 2022, 8 pages.

International Search Report in International Appln. No. PCT/KR2022/001804, dated May 30, 2022, 9 pages.

Office Action in Chinese Appln. No. 202210118382.2, mailed on Mar. 23, 2023, 15 pages(with English translation).

Office Action in Taiwanese Appln. No. 111104436, mailed on Apr. 26, 2023, 18 pages(with English translation).

Office Action in Korean Appln. No. 10-2021-0017343, mailed on Jun. 13, 2025, 9 pages (with English translation).

\* cited by examiner

【FIG. 1】
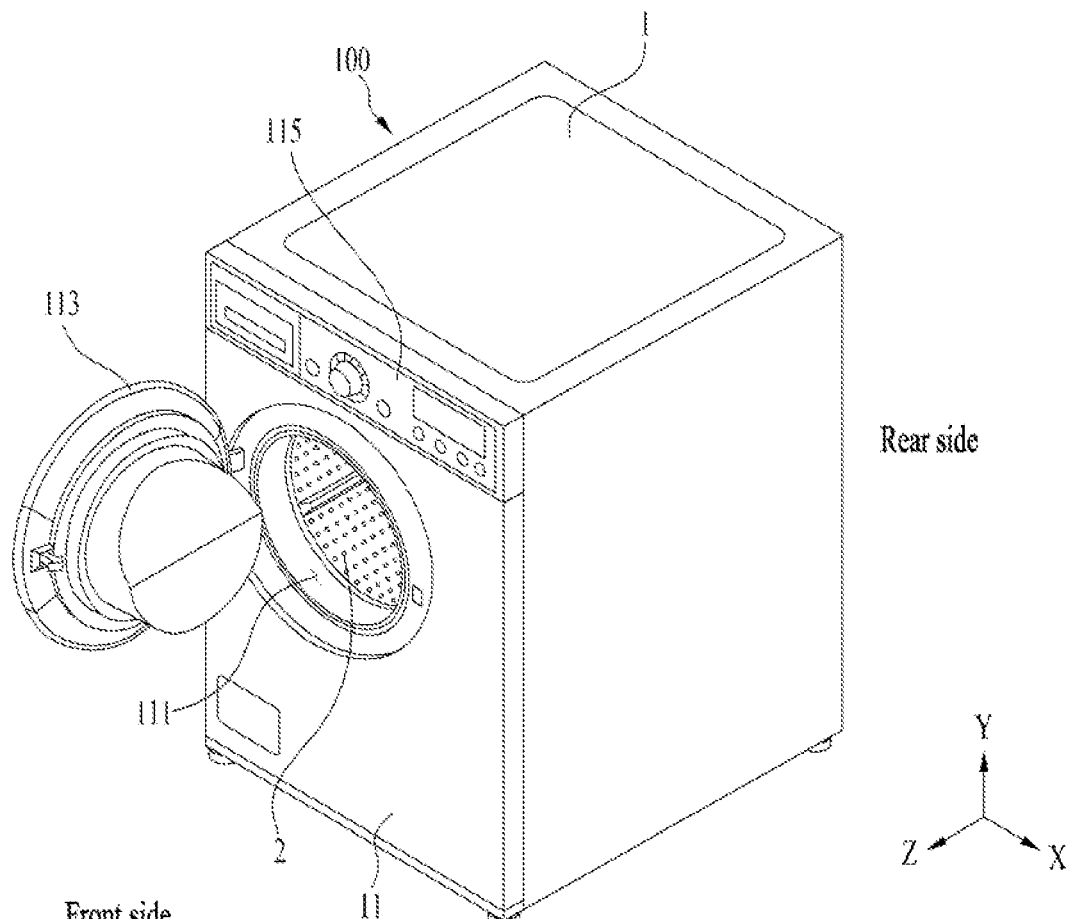

【FIG. 2】
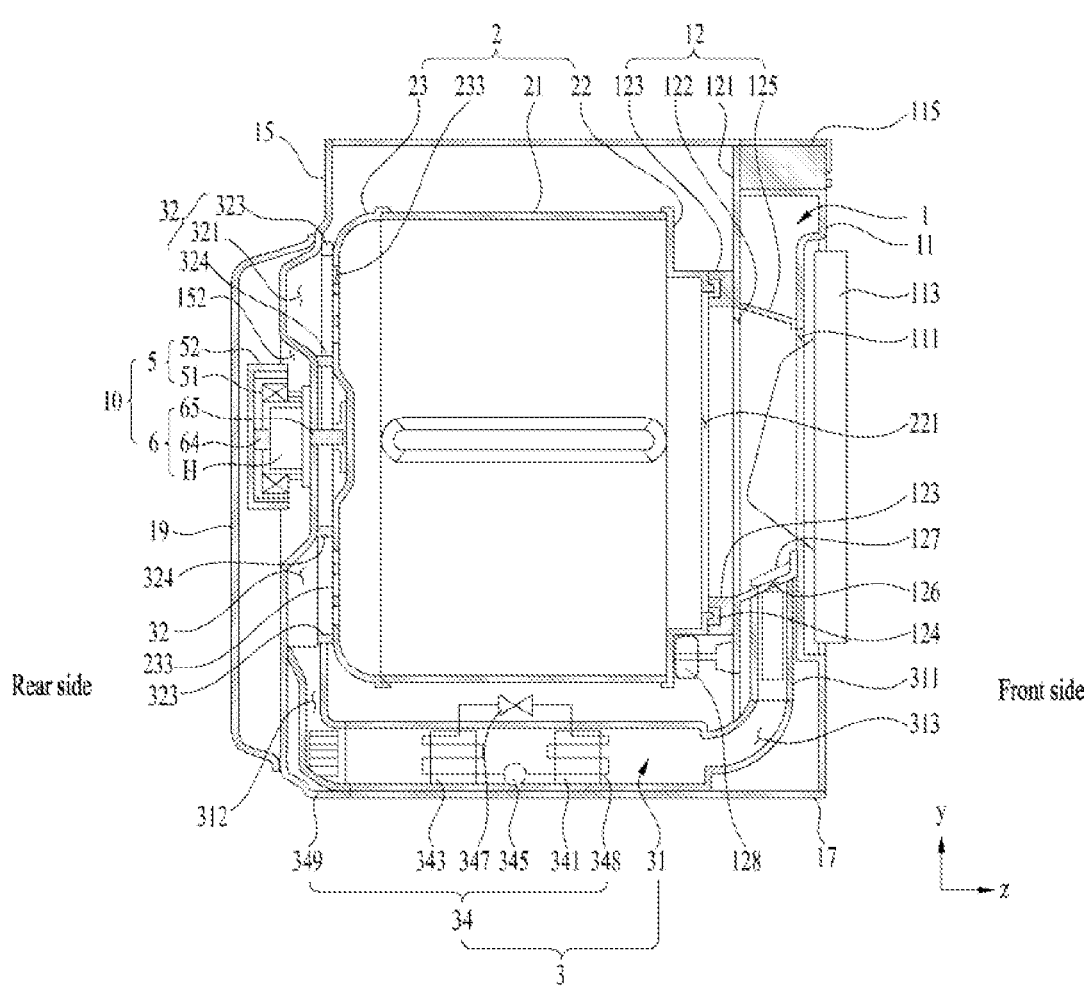

[FIG. 3]
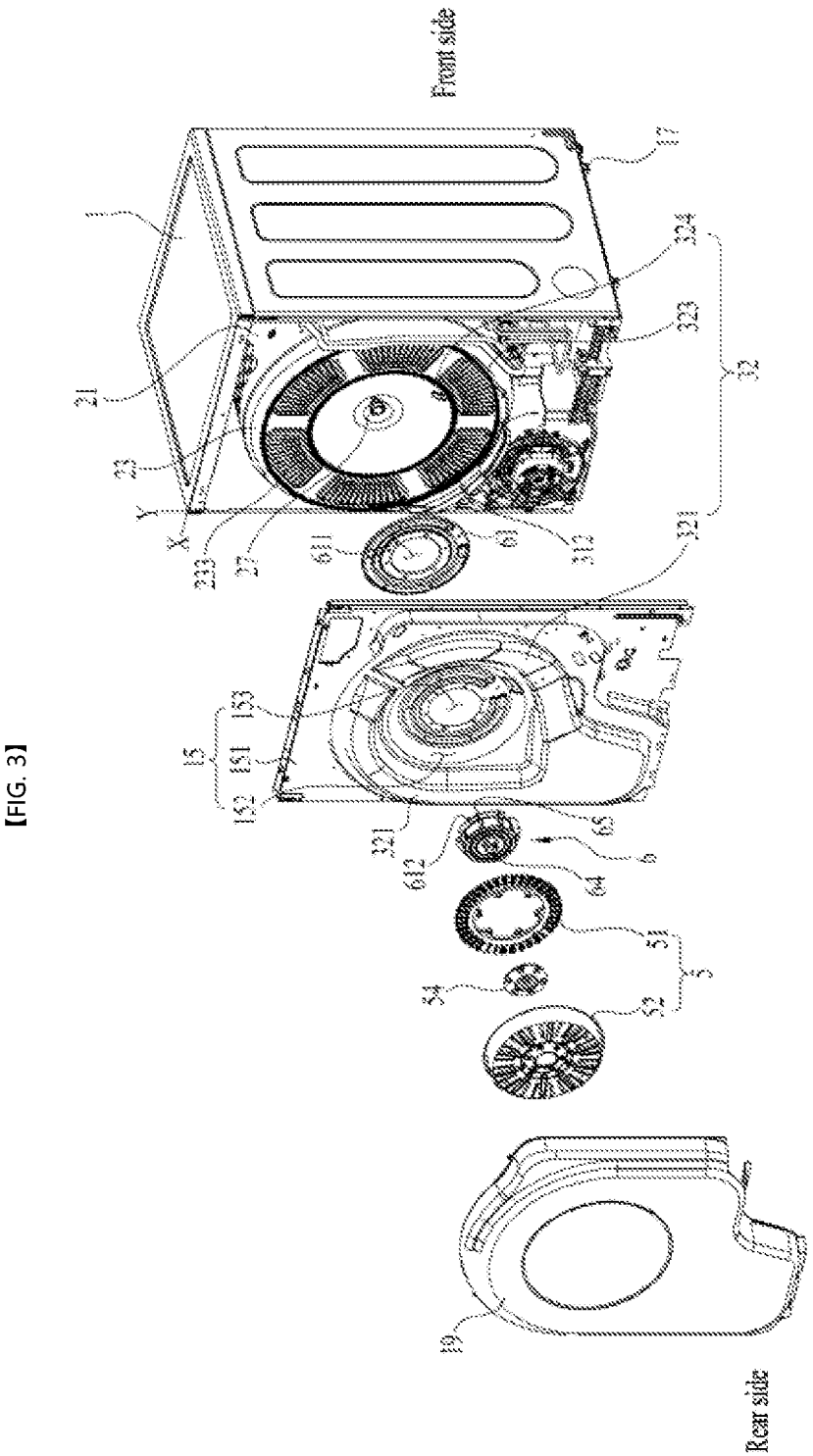

【FIG. 4】
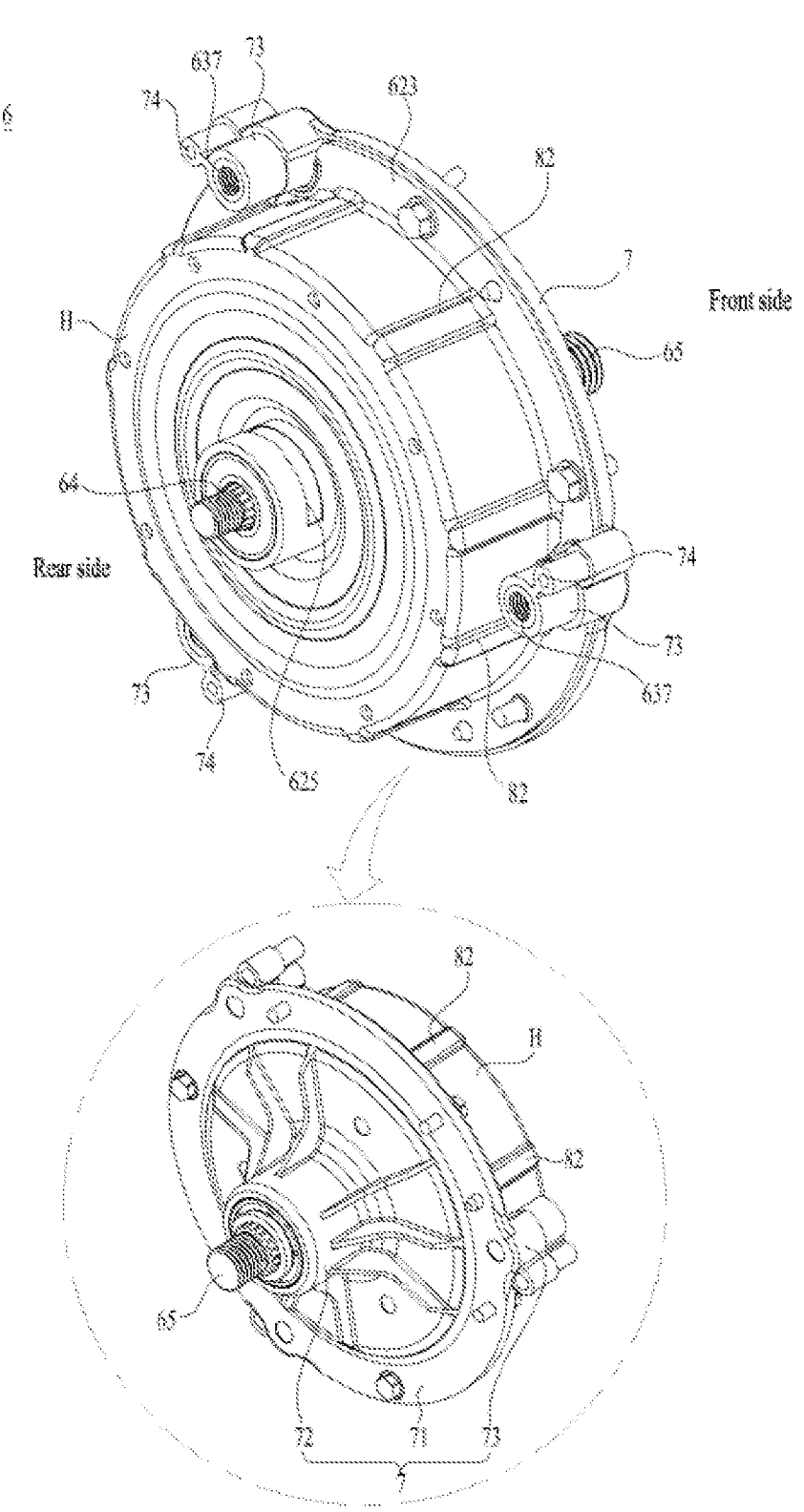

[FIG. 5]
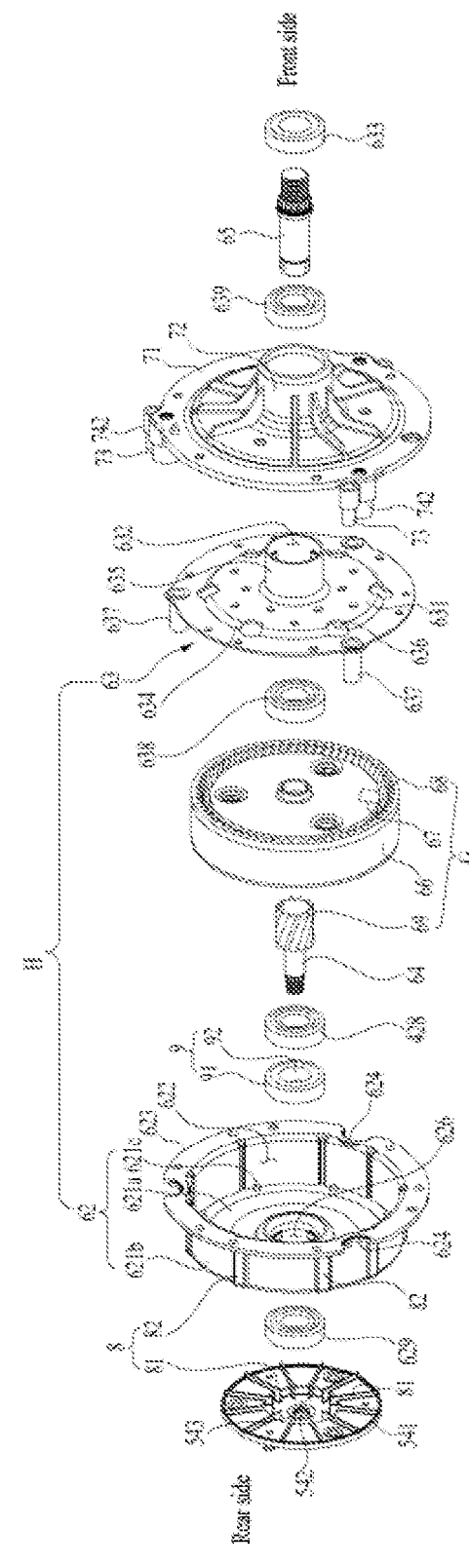

【FIG. 6】
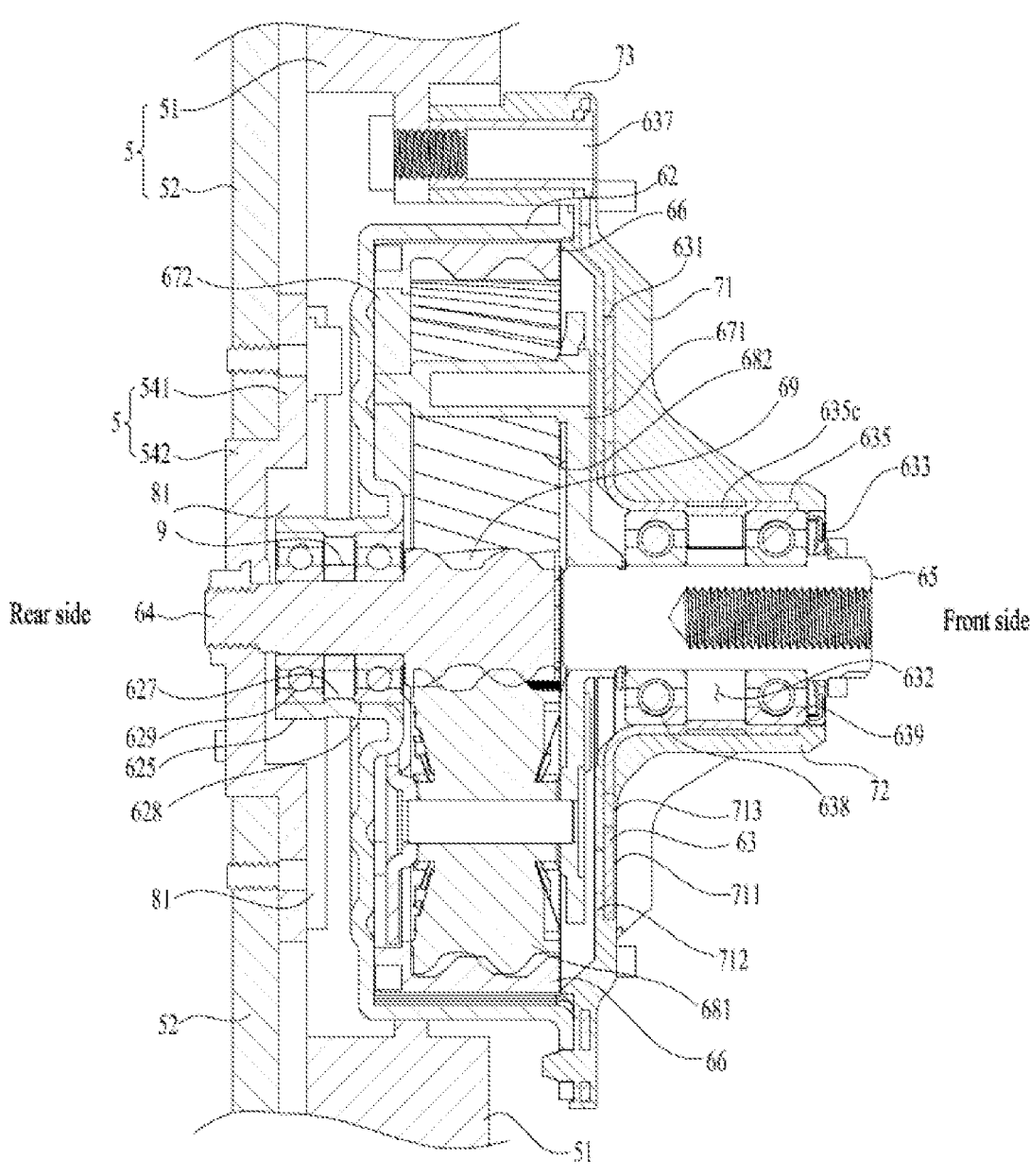

2
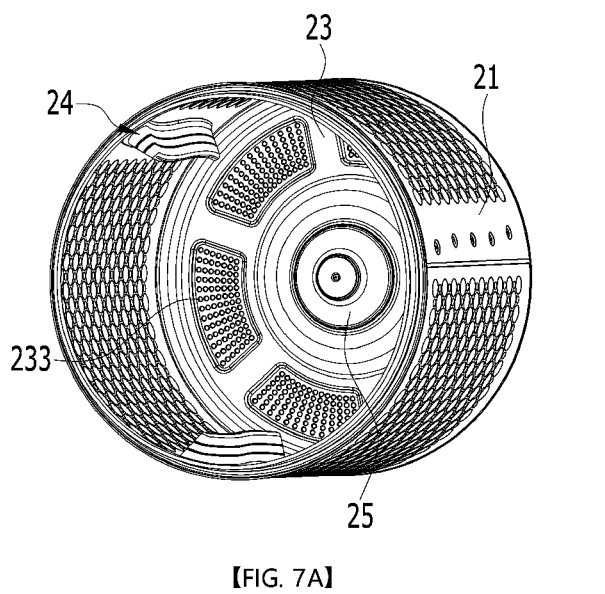
【FIG. 7A】
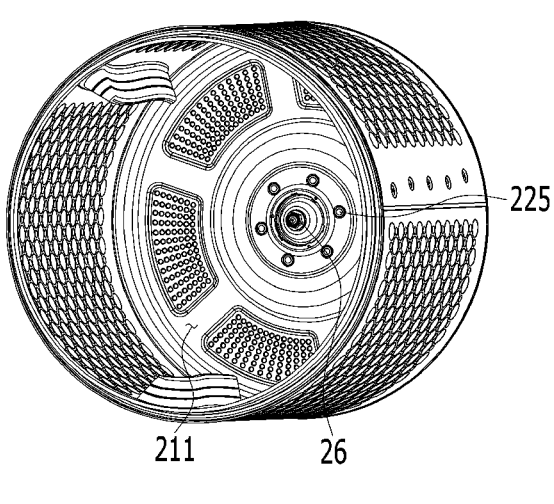
【FIG. 7B】

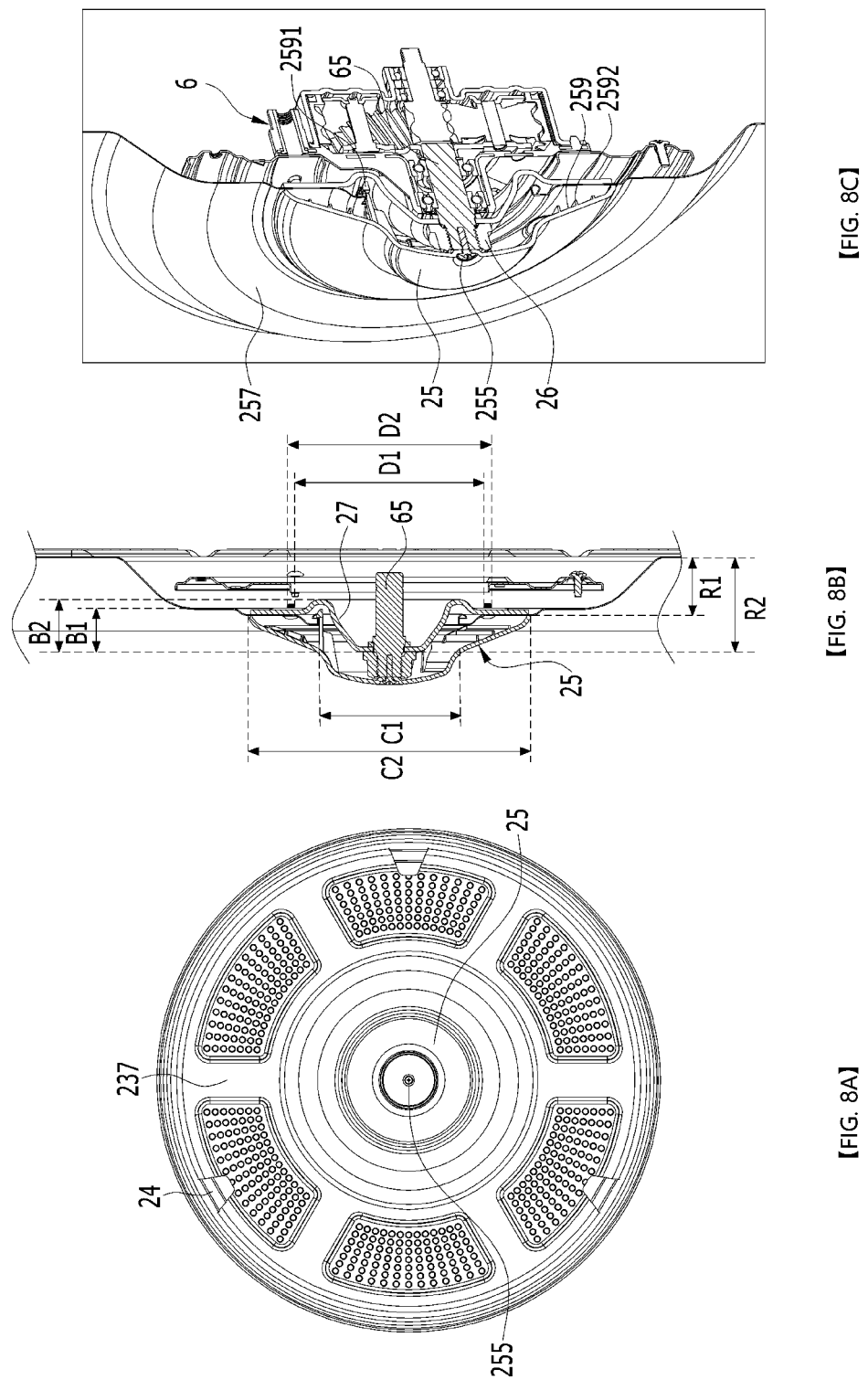
[FIG. 8C]
[FIG. 8B]
[FIG. 8A]

【FIG. 9】
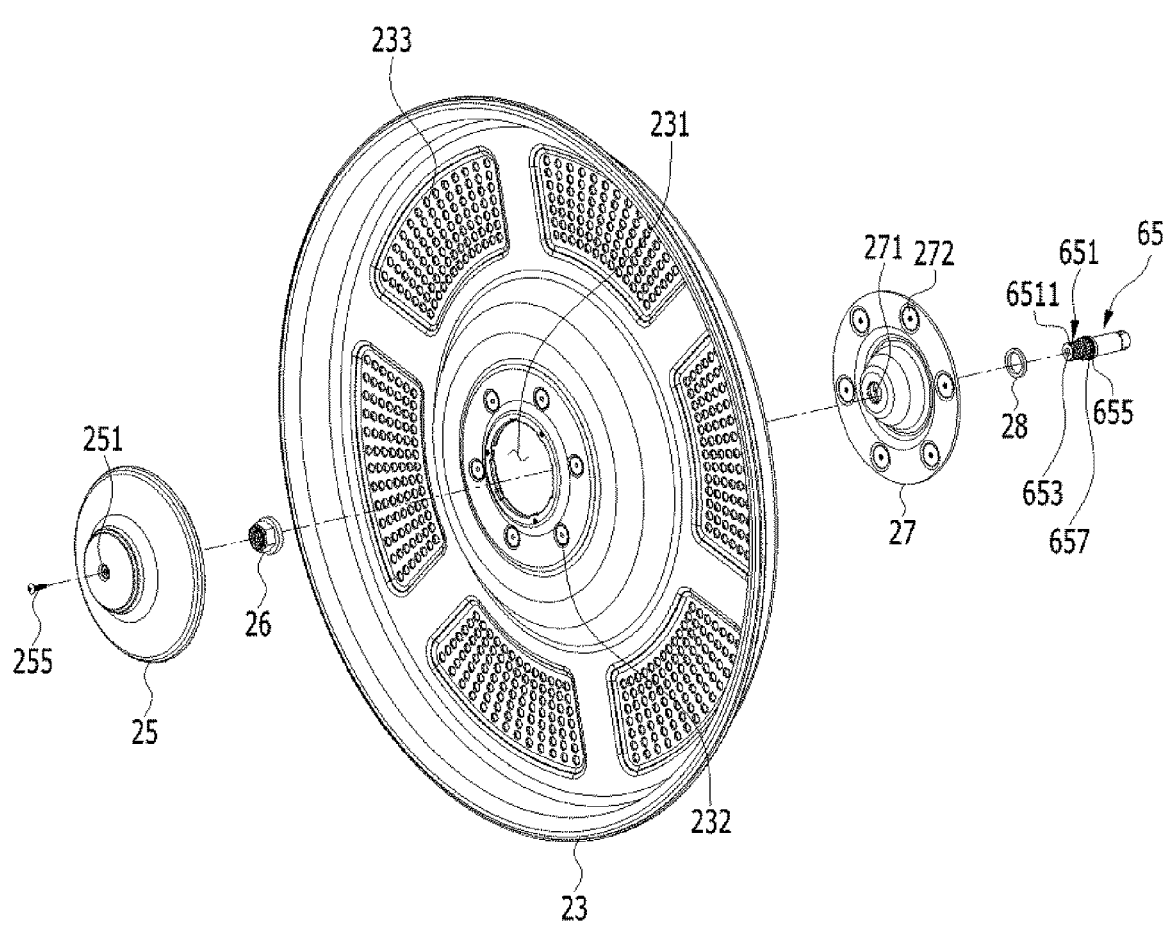

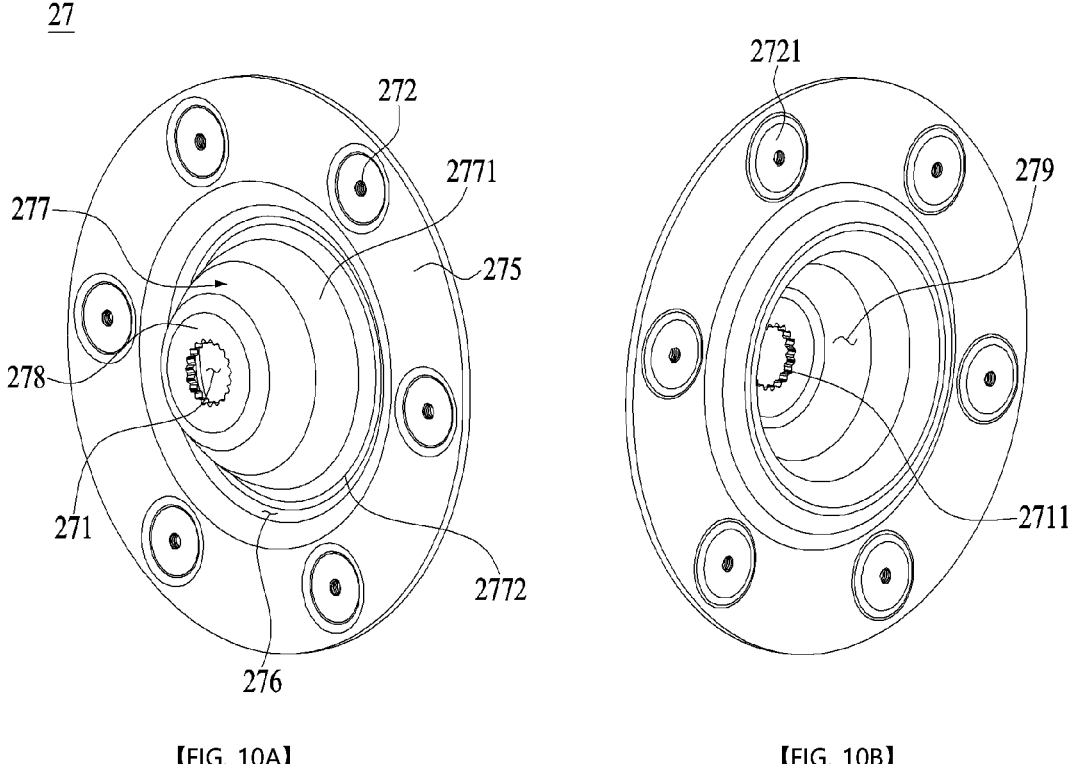
【FIG. 10A】　　　　　　　　　　　　　　【FIG. 10B】

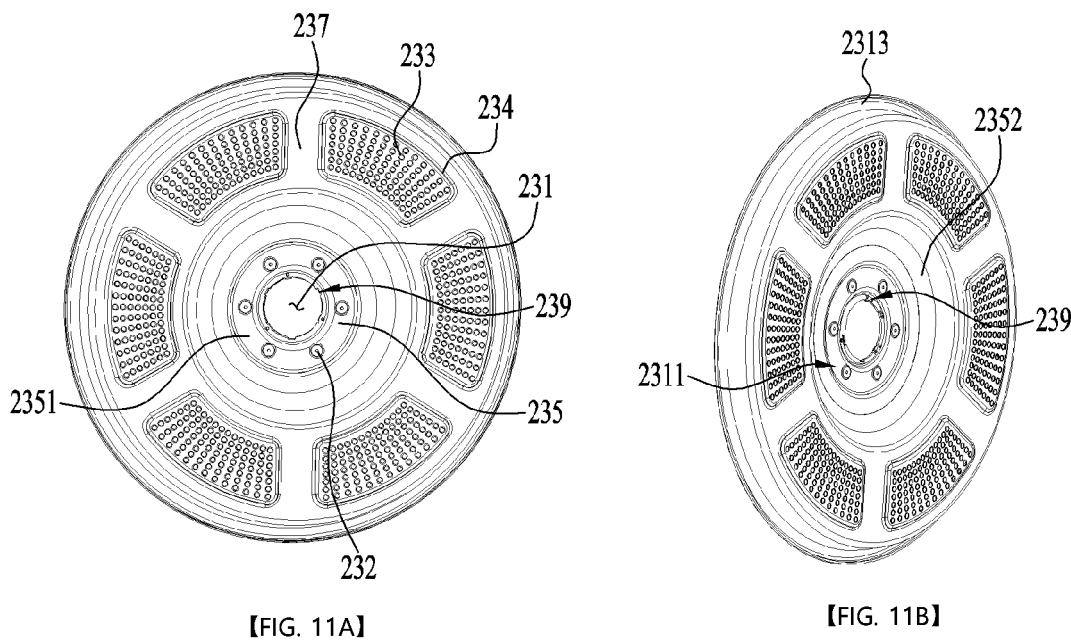
【FIG. 11A】                    【FIG. 11B】

【FIG. 12】
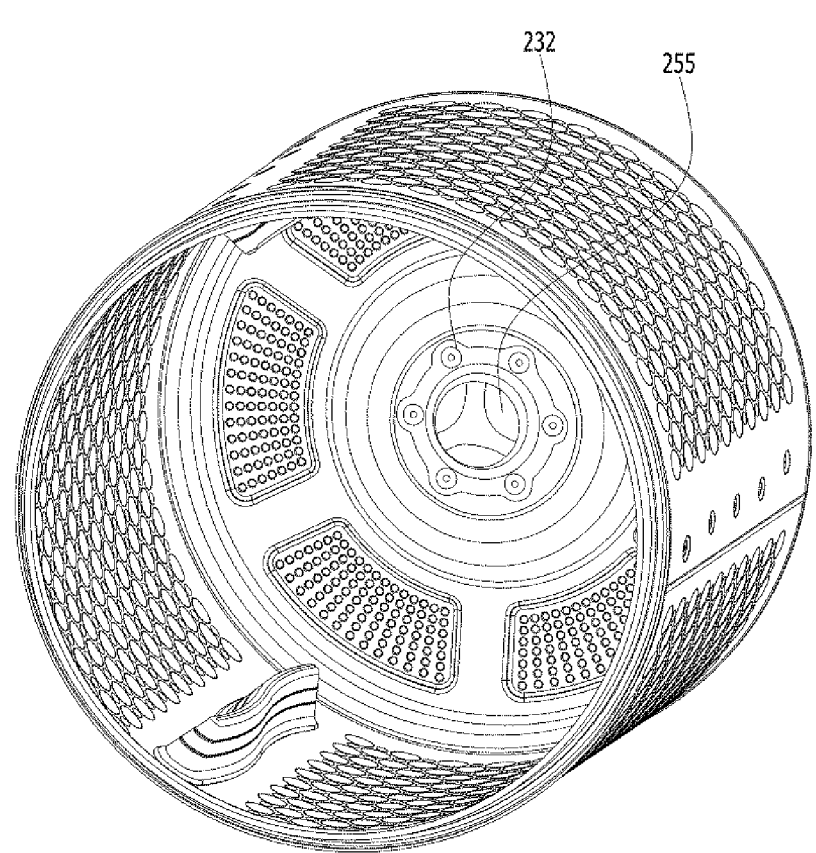

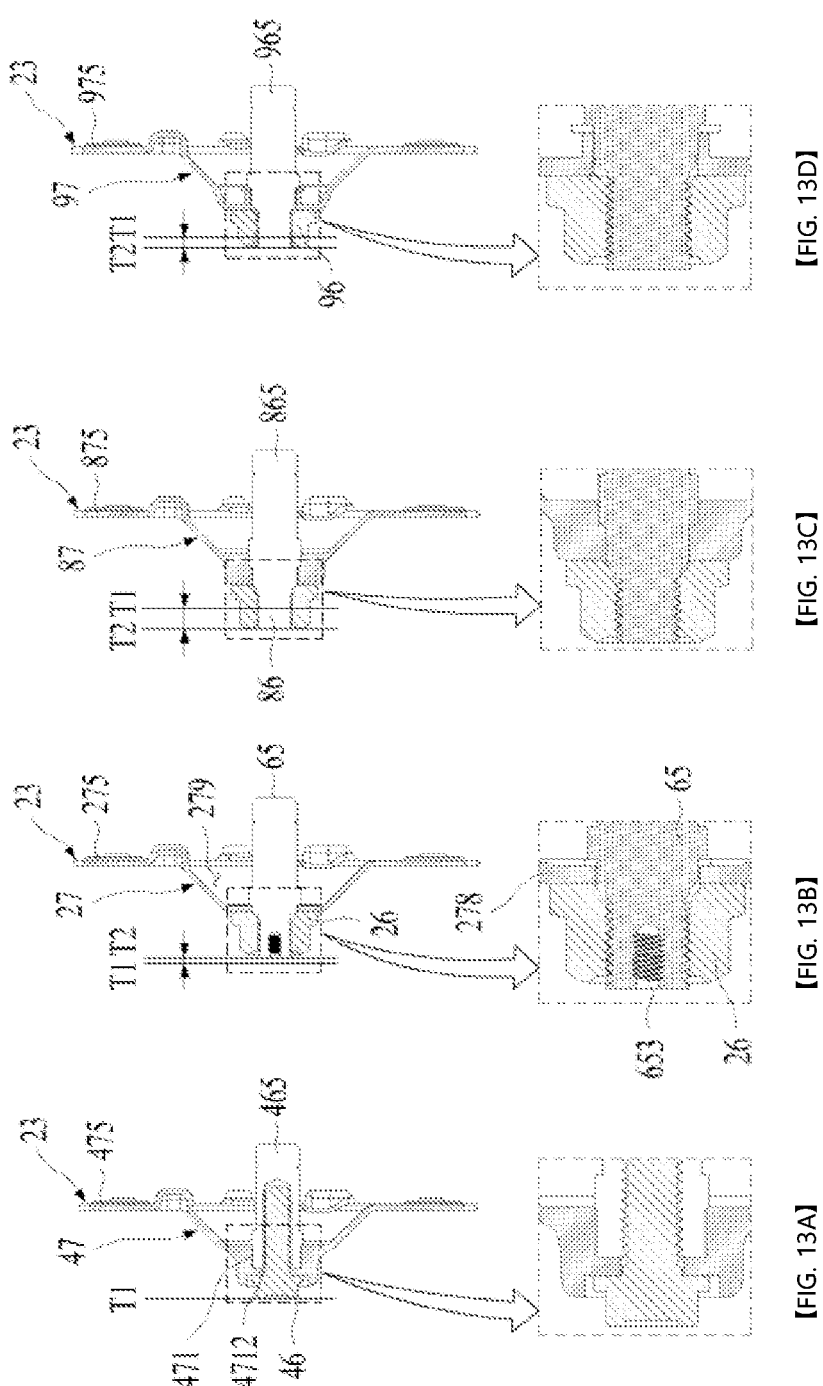
[FIG. 13A]
[FIG. 13B]
[FIG. 13C]
[FIG. 13D]

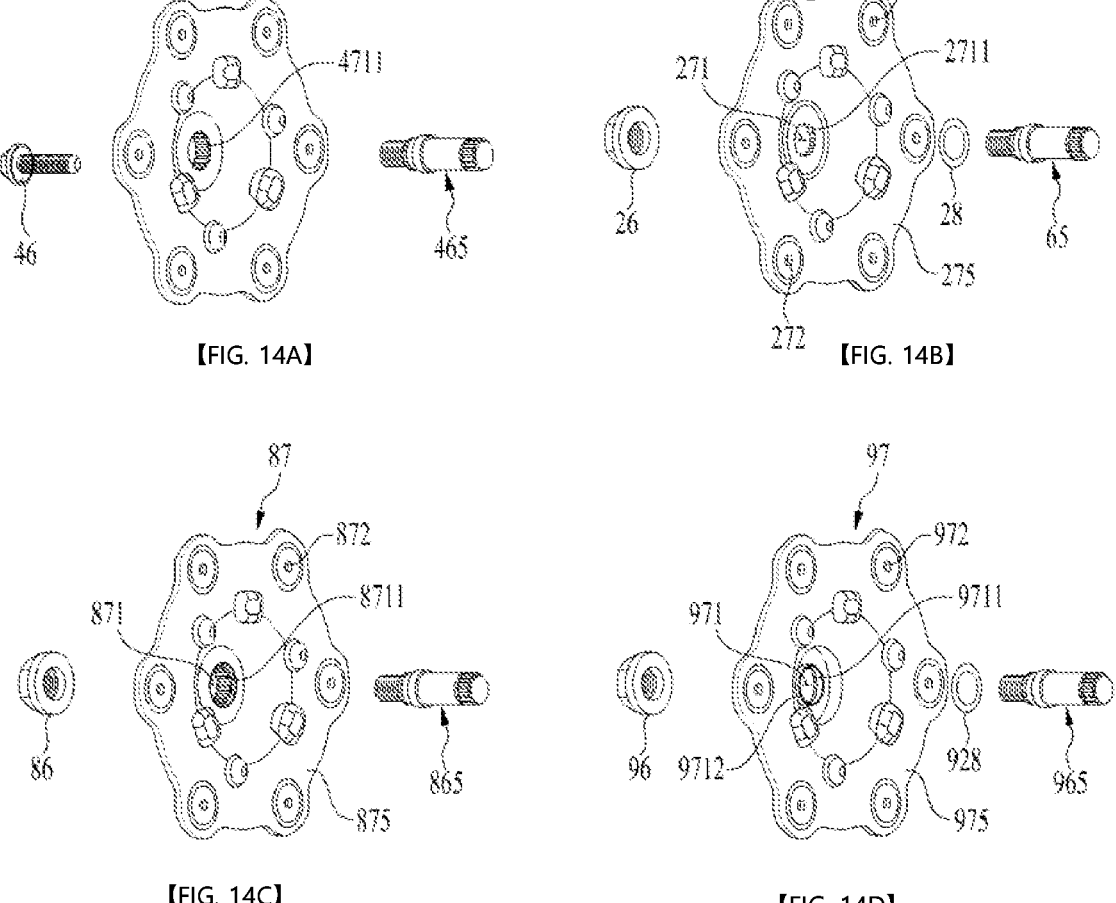
【FIG. 14A】
【FIG. 14B】
【FIG. 14C】
【FIG. 14D】

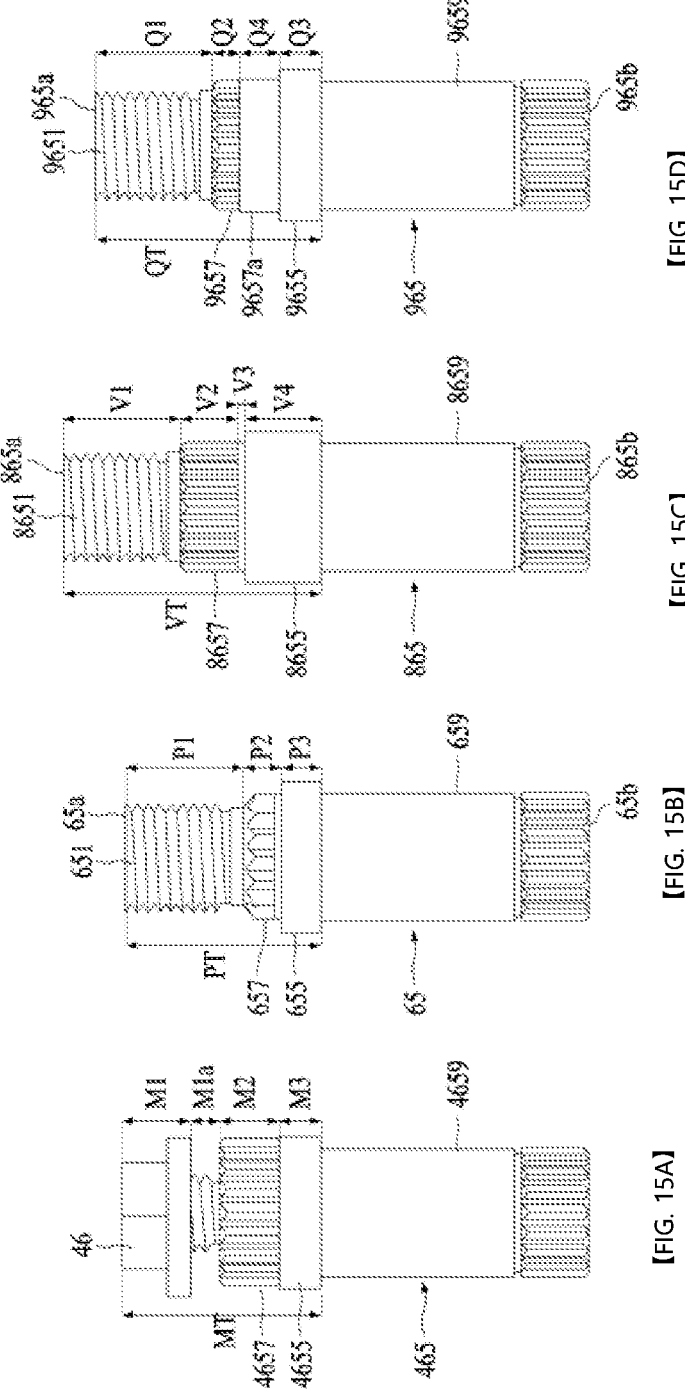
[FIG. 15D]
[FIG. 15C]
[FIG. 15B]
[FIG. 15A]

1

LAUNDRY TREATMENT APPARATUS

CROSS-REFERENCE TO RELATED APPLICATION

This application claims priority to and the benefit of Korean Patent Application Nos. 10-2021-0017343, filed on Feb. 8, 2021 and 10-2021-0024267, filed on Feb. 23, 2021, the disclosure of which are incorporated herein by reference in their entireties.

TECHNICAL FIELD

The present disclosure relates to a laundry treatment apparatus, and more particularly, to a coupling structure between a rear cover of a drum, a shaft bracket, and a rotating shaft.

BACKGROUND

A laundry treatment apparatus refers to an apparatus designed to wash and dry laundry and to remove wrinkles from the laundry in a home or a laundromat. Those classified into a laundry treatment apparatus may include a washing machine configured to wash laundry, a dryer configured to dry laundry, a combined washing and dryer configured to perform both washing and drying, a laundry management machine configured to refresh laundry, and a steamer configured to remove wrinkles from laundry.

Dryers are classified into an exhaustion-type dryer and a circulation-type dryer, which are both constructed so as to perform a drying procedure of generating hot air using a heater and exposing laundry to the hot air to remove moisture from the laundry. For example, the dryers are constructed to evaporate the moisture contained in an object to be treated, such as clothes, bedclothes and the like, received in a drum (or a tub) by supplying hot air to the object to be treated. Here, the dryers may be classified into a condensation type and an exhaustion type depending on the method by which hot and humid air including moisture is treated.

A general dryer is configured so as to intensively perform a drying procedure by omitting a structure configured to supply water to laundry or discharge water and also by omitting a tub in a cabinet configured to contain water therein. Consequently, there is an advantage of simplifying the internal structure of the dryer and of improving drying efficiency by directly supplying hot air to a drum containing laundry therein.

Specifically, a general dryer is configured to transmit rotational force to a drum to rotate the drum containing laundry therein by using a belt surrounding the drum. The reason for this is because the dryer does not require the rotational speed of the drum to be maintained or the direction of rotation of the drum to be changed, and thus it is sufficient to rotate the drum merely using a belt, unlike a washing machine. However, if it is possible to change the rotational speed and the direction of rotation of the drum provided in the dryer, the dryer becomes additionally capable of reducing the drying time and improving drying efficiency.

A conventional dryer includes a motor disposed behind a drum and connected to the drum in order to rotate the drum. Particularly, the conventional dryer includes a rotating shaft of the drum that extends through the bottom surface of the drum and the bottom surface of the drum and a coupler are fixed to each other by means of a stud. However, the complicated assembly structure may be visible to a user, thereby deteriorating the appearance of the dryer. Furthermore, the coupling member between the bottom surface of the drum and the stud, the complicated shape of a portion of the bottom surface of the drum at which the rotating shaft is positioned, the projecting shape of the stud, and the like may cause damage to laundry, which is rotated by the drum. In addition, a zipper and the like attached to the laundry may cause scratches on the bottom surface of the drum, the stud, the coupler, and the like. When the scratches are formed on the components, there is a problem in that the components are rusted due to moisture.

In addition, a conventional dryer includes a screw hole provided in a rotating shaft and the rotating shaft, a shaft bracket, and a rear cover are coupled to each other by means of a screw-type stud. However, because a bolt and the center of the rotating shaft must be aligned with each other, there is a problem in which ease of an assembly operation is deteriorated and the strength of the coupling portion of the bolt, that is, the fastening force, is lowered.

SUMMARY

The present disclosure is directed to increase the clamping force between a shaft bracket (or a shaft bushing) and a rotating shaft.

The present disclosure is also directed to facilitate assembly of the shaft bracket and the rotating shaft.

The present disclosure is also directed to enable the rotational force of the rotating shaft to be efficiently transmitted to a drum via the shaft bracket by preventing slippage between the shaft bracket and the rotating shaft.

The present disclosure is also directed to increase the rigidity of the shaft bracket.

The present disclosure is also directed to reduce damages on laundry caused by a coupling member for coupling the drum to a drum-rotating shaft configured to rotate the drum during rotation of the drum.

The present disclosure is also directed to reduce damages on the bottom surface of the drum and various assembly members for coupling the bottom surface of the drum to the drum-rotating shaft from caused by laundry during rotation of the drum.

The present disclosure is also directed to prevent damaged assembly members from being rusted by wet laundry.

The present disclosure is also directed to block, to a user, the exposure of the assembled shape of the drum and the drum-rotating shaft configured to rotate the drum.

In order to accomplish the above objects, in order to increase the strength of the shaft bracket, the laundry treatment apparatus can include a hot-rolled galvanized sheet iron, in place of conventional die-cast aluminum. Furthermore, in order to increase the fastening force between the rotating shaft and the coupling member, fastening rigidity, and the slip torque between the rotating shaft and the shaft bracket, the laundry treatment apparatus can include a nut-shaped coupling member capable of being coupled to the outer surface of the rotating shaft, in place of a conventional bolt. In addition, in order to prevent the nut-shaped coupling member from being loosened, the laundry treatment apparatus can include a screw-locking agent.

According to one aspect of the subject matter described in this application, a laundry treatment apparatus can include a drive unit including a rotating shaft, a drum configured to be rotated by the rotating shaft and receive laundry and including a cylindrical drum body and a rear cover, the rear cover defining a rear surface of the drum body and a rear cover through hole in an axial direction of the rotating shaft, and a shaft bracket that (i) is coupled to the rear cover and the rotating shaft, (ii) covers the rear cover through hole, (iii) is configured to transmit rotational force of the rotating shaft to the drum, and (iv) defines a shaft-coupling hole in the axial direction. The rotating shaft can be inserted into the shaft-coupling hole, projected into an inside of the drum, and coupled to the shaft bracket by a rotating-shaft-fastening member.

Implementations according to this aspect can include one or more of the following features. For example, the rotating shaft can include a rotating shaft insertion portion (i) provided at a first end of the rotating shaft that is inserted into the shaft-coupling hole, (ii) extending to a first predetermined length in the axial direction, and (iii) providing a thread at an outer circumferential surface, and a rotating shaft transmission portion (i) extending from the rotating shaft insertion portion to a second predetermined length in the axial direction, (ii) engaging with an inner circumferential surface of the shaft-coupling hole, and (iii) configured to transmit the rotational force of the rotating shaft to the shaft bracket. The rotating shaft insertion portion can be coupled to the shaft bracket by the rotating-shaft-fastening member.

In some implementations, at least a portion of the inner circumferential surface of the shaft-coupling hole can have a toothed or serrated form, and an outer circumferential surface of the rotating shaft insertion portion can have a shape corresponding to the inner circumferential surface of the shaft-coupling hole. In some examples, a length of the rotating shaft insertion portion can be greater than a length of the rotating shaft transmission portion in the axial direction.

In some implementations, an outer diameter of the rotating shaft insertion portion can be less than an outer diameter of the rotating shaft transmission portion in a radial direction of the rotating shaft. In some implementations, the rotating shaft can further include a rotating shaft flange extending from the rotating shaft transmission portion to a third predetermined length in the axial direction, an outer diameter of the rotating shaft flange being greater than an outer diameter of the rotating shaft transmission portion.

In some examples, the outer diameter of the rotating shaft flange can be greater than a diameter of the inner circumferential surface of the shaft-coupling hole so as to block insertion of the rotating shaft beyond a predetermined point based on the rotating shaft being inserted into the shaft-coupling hole. In some example, the inner circumferential surface of the shaft-coupling hole can be stepped so as to correspond to the rotating shaft transmission portion and the rotating shaft flange such that, based on the rotating shaft being inserted into the shaft-coupling hole, the rotating shaft transmission portion is inserted into the shaft-coupling hole and a portion of the rotating shaft flange is inserted into the shaft-coupling hole so as to block the rotating shaft to be further inserted.

In some examples, a length of the shaft-coupling hole in the axial direction can be (i) greater than a length of the rotating shaft transmission portion and (ii) less than a sum of the length of the rotating shaft transmission portion and a length of a portion of the rotating shaft flange. In some implementations, the rotating shaft can further include a rotating shaft flange that extends in the axial direction over a third predetermined length between the first end of the rotating shaft and a remaining end of the rotating shaft and that has an outer diameter greater than an outer diameter of the rotating shaft, and a rotating shaft connection portion provided between the rotating shaft flange and the rotating shaft transmission portion.

In some examples, an outer diameter of the rotating shaft connection portion can be (i) less than the outer diameter of the rotating shaft flange and (ii) equal to or greater than an outer diameter of the rotating shaft insertion portion. In some examples, the shaft-coupling hole can include a shaft-coupling-hole extension that protrudes at a predefined angle from the inner circumferential surface of the shaft-coupling hole and that extends in the axial direction toward the drive unit such that, based on the rotating shaft being inserted into the shaft-coupling hole, the shaft-coupling-hole extension is configured to block insertion of the rotating shaft flange into the shaft-coupling hole.

In some implementations, based on the shaft bracket being coupled to the rear cover, a portion of the shaft bracket can project into the inside of the drum through the rear cover through hole. In some examples, the shaft bracket can include a ring-shaped shaft coupler defining the shaft-coupling hole, a shaft bracket flange radially spaced apart from a center of the shaft-coupling hole and coupled to the rear cover, and a shaft bracket sloping portion disposed between the shaft coupler and the shaft bracket flange and connected to the shaft coupler and the shaft bracket flange, where, based on the shaft bracket flange being coupled to the rear cover, the shaft coupler is inserted into the inside of the drum through the rear cover through hole.

In some implementations, the laundry treatment apparatus can further include a protective cover coupled to the rear cover so as to block the shaft bracket and the rotating shaft from contacting the laundry. In some examples, the protective cover can be coupled to the rotating shaft. In some examples, the protective cover can be coupled to the rotating shaft by a protective-cover-fastening member.

In some implementations, the shaft bracket can define shaft-coupling hole in the axial direction so as to be coupled to the rotating shaft, and the rotating shaft can be (i) coupled to the shaft bracket through the shaft-coupling hole and (ii) inserted into the inside of the drum. In some implementations, an outer diameter of the protective cover can be greater than an inner diameter of the rear cover through hole. In some examples, an outer diameter of the shaft bracket can be greater than an inner diameter of the rear cover through hole.

BRIEF DESCRIPTION OF THE DRAWINGS

FIG. 1 is a diagram illustrating an exemplary laundry treatment apparatus.

FIG. 2 is a diagram illustrating a cross-section of the exemplary laundry treatment apparatus.

FIG. 3 is a diagram illustrating an internal structure of the exemplary laundry treatment apparatus.

FIG. 4 is a diagram illustrating an exemplary power transmission unit.

FIG. 5 is a diagram illustrating an exploded view of the exemplary power transmission unit.

FIG. 6 is a diagram illustrating a cross-section of the exemplary power transmission unit.

FIG. 7A is a diagram illustrating an exemplary drum and an exemplary protective cover.

FIG. 7B is a diagram illustrating an exemplary shaft bracket and an exemplary coupling nut excluding the protective cover.

FIG. 8A is a diagram illustrating a rear cover of the exemplary drum when viewed from the front.

FIG. 8B is a diagram illustrating a cross-section of an exemplary assembly of the protective cover, the drum-rotating shaft, the shaft bracket and the rear cover.

FIG. 8C is a diagram illustrating the exemplary assembly of the protective cover, the drum-rotating shaft, the shaft bracket, and the rear cover.

FIG. 9 is a diagram illustrating an exploded view of the rear cover of the exemplary drum.

FIGS. 10A and 10B are diagrams illustrating the shaft bracket when viewed from the front and the rear, respectively.

FIG. 11A is a diagram illustrating the rear cover when viewed from the front.

FIG. 11B is a diagram illustrating the rear cover when viewed from the rear.

FIG. 12 is a diagram illustrating an exemplary protective cover.

FIG. 13A is a diagram illustrating a rotating shaft and a shaft bracket of a conventional laundry treatment apparatus in an enlarged cross-sectional view.

FIGS. 13B, 13C, and 13D are diagrams illustrating an exemplary rotating shaft and an exemplary shaft bracket in an enlarged cross-sectional view.

FIG. 14A is a diagram illustrating an exploded view of the rotating shaft and the shaft bracket of the conventional laundry treatment apparatus.

FIGS. 14B, 14C, and 14D are diagrams illustrating exploded views of the exemplary rotating shaft and the exemplary shaft bracket.

FIGS. 15A, 15B, 15C, and 15D are diagrams illustrating a comparison between the rotating shaft of the conventional laundry treatment apparatus and the exemplary rotating shaft.

DETAILED DESCRIPTION

FIG. 1 is a diagram illustrating an exemplary laundry treatment apparatus 100. The laundry treatment apparatus 100 can include a cabinet 1 and a drum 2, which is rotatably provided in the cabinet 1 so as to define a space for receiving laundry (an object to be washed or dried). As illustrated in FIG. 2, the cabinet 1 can be provided therein with a drying unit 3 configured to supply hot and dried air (air having a temperature higher than an ambient temperature and a dryness higher than the dryness of indoor air) to remove moisture from the laundry.

Referring to FIGS. 1 and 2, the cabinet 1 can include a front panel 11 defining the front surface of the laundry treatment apparatus 100 and a base panel 17 defining the bottom surface of the laundry treatment apparatus 100. The front panel 11 can be provided with an entrance 111 communicating with the drum 2. The entrance can be configured to be opened and closed by a door 113.

The front panel 11 can be provided with a control panel 115. The control panel 115 can include an input unit, into which control commands are input by a user, and a display unit configured to output information such as control commands, which are capable of being selected by the user. The input unit can include a power supply request unit configured to request supply of power to the laundry treatment apparatus 100, a course input unit configured to allow a user to select a desired course among a plurality of courses, and an execution request unit configured to request execution of the course that is selected by the user.

The drum 2 can have a hollow cylinder shape. FIG. 2 depicts the drum 2 composed of a cylindrical drum body 21, which is open at the front and rear surfaces thereof, a front cover 22 defining the front surface of the drum body 21, and a rear cover 23 defining the rear surface of the drum body 21. The front cover 22 can include a drum entrance 221, through which the inside of the drum body 21 communicates with the outside of the drum 2, and the rear cover 23 can include an air introduction hole 233 (see FIG. 3), through which external air is introduced into the drum body 21.

The drum body 21 can further include a lifter 24 (see FIGS. 7A and B). The lifter 24 can be constructed such that a board, which extends toward the rear cover 23 from the front cover 22, projects toward the rotational center of the drum 2 from the drum body 21 (that is, toward the rotational center of the drum 2 from the circumferential surface of the drum 2).

In some implementations, when the laundry treatment apparatus 100 is designed to perform only drying of laundry, there is no need to provide drum through holes, which are defined through the drum body 21 so as to allow the inside of the drum 2 to communicate with the outside of the drum 2.

The drum 2 can be rotatably held by at least one of a first support 12 or a second support 15. In some implementations, the rear cover 23 can be held by the second support 15 so as to be rotatable by a motor 5 (see FIG. 3), and the front cover 22 is rotatably connected to the first support 12.

The first support 12 can include a support panel 121, which is coupled to the cabinet 1 and is disposed between the front panel 11 and the front cover 22. The support panel 121 can be coupled to the base panel 17, and can be positioned between the front panel 11 and the front cover 22. In some implementations, the rear surface of the front panel 11 (the surface that faces the support panel 121) can be coupled to the support panel 121, and the lower end of the front panel 11 can be coupled to the base panel 17.

The support panel 121 can include a support panel through hole 122, a drum connection body 123 (see FIG. 2) connecting the support panel through hole 122 with the drum entrance 221, and a panel connection body 125 connecting the support panel through hole 122 with the entrance 111. The support panel through hole 122 can be defined through the support panel 121 so as to allow the entrance 111 to communicate with the drum entrance 221.

As illustrated in FIG. 2, the drum connection body 123 can include a pipe coupled to the rear surface of the support panel 121 (the surface that faces the drum entrance). One end of the drum connection body 123 can be configured so as to surround the support panel through hole 122, and the free end of the drum connection body 123 can be configured so as to support the front cover 22. In some implementations, the free end of the drum connection body 123 can be configured so as to be inserted into the drum entrance 221 or to be in contact with the free end of the front cover 22 defining the drum entrance 221.

FIG. 2 illustrates the laundry treatment apparatus 100 in which the free end of the drum connection body 123 is in contact with the free end of the front cover 22. For example, the drum connection body 123 can be provided with a ring-shaped connection damper 124. The connection damper 124 can serve to reduce the risk of the drum entrance 221 being separated from the drum connection body 123 (the risk of the air in the drum leaking into the cabinet) when the drum 2 rotates or vibrates.

The panel connection body 125 can include a pipe coupled to the front surface of the support panel 121 (the surface that faces the front panel). One end of the panel connection body 125 can be configured so as to surround the support panel through hole 122, and the other end of the panel connection body 125 can be configured so as to be connected to the entrance 111. In some implementations, the laundry supplied to the entrance 111 can be transferred to the drum body 21 through the panel connection body 125, the support panel thorough hole 122, the drum connection body 123, and the drum entrance 221.

The support panel 121 can include an exhaust port 126, which is provided through the panel connection body 125. A filter 127 can be detachably coupled to the exhaust port 126. The filter 127 can be configured to have any structure capable of filtering contaminants from the air that flows to the exhaust port 126 from the drum 2.

The support panel 121 can further include a drum support 128 configured to block the drum 2 from drooping. The drum support 128 can include a first roller 128, which is coupled to the support panel 121 so as to rotatably support the drum 2, and a second roller. Although FIG. 3 illustrates the laundry treatment apparatus 100 in which the first roller 128 supports the drum body 21, the rollers may support the front cover 22.

The second support 15 can include a fixed panel 151, which is coupled to the cabinet 1 so as to be spaced apart from the rear cover 23. FIG. 3 illustrates the fixed panel 151 coupled to the base panel 17 so as to define the rear surface of the laundry treatment apparatus 100 (i.e. the rear surface of the cabinet 1).

The fixed panel 151 can include a motor-mounting recess 152, which defines a space in which the motor 5 is mounted. The motor-mounting recess 152 can include a groove depressed toward the rear cover 23 of the drum 2 from the fixed panel 151. The fixed panel 151 can include a fixed panel through hole 153 through which a shaft configured to rotate the drum 2 extends. The fixed panel through hole 153 can be positioned in the motor-mounting recess 152.

As described above, when the drum 2 is composed of the drum body 21, the front cover 22 coupled to the drum body 21, and the rear cover 23 coupled to the drum body 21, the rigidity of the drum 2 can be increased, compared to a structure in which the front surface and the rear surface of the drum body 21, which are open, are respectively and rotatably connected to the support panel 121 and the fixed panel 151. The increased rigidity of the drum 2 enables minimization of deformation of the drum body 21 during rotation of the drum 2, thereby minimizing a problem in which laundry is jammed between the drum body 21 and the fixed panel 151 (i.e. thereby enabling minimization of the load on the motor).

As illustrated in FIG. 2, the drying unit can include an exhaust passage 31 connected to the exhaust port 126, a supply passage 32 configured to guide the air in the exhaust passage 31 toward the drum body 21, and a heat-exchanging unit 34, which is disposed in the exhaust passage 31 so as to sequentially perform dehumidification and heating of the air.

The exhaust passage 31 can include a first duct 311 connected to the exhaust port 126, a second duct 312 connected to the supply passage 32, and a third duct 313 connecting the first duct to the second duct 312. The third duct 313 can be coupled to the base panel 17.

The heat-exchanging unit 34 can be implemented as any device capable of sequentially performing dehumidification and heating of the air that is introduced into the exhaust port 126. FIG. 2 illustrates the heat-exchanging unit 34 implemented as a heat pump. For example, the heat-exchanging unit 34 can include a first heat exchanger (a heat adsorption part) 341 configured to remove moisture from the air introduced into the exhaust passage 31, a second heat exchanger (a heat radiation part) 343 configured to heat the air that has passed through the heat adsorption part 341, and a fan 349 configured to cause the air discharged from the drum 2 to sequentially pass through the heat adsorption part and the heat radiation part and then to be transferred to the supply passage 32.

The heat adsorption part 341 and the heat radiation part 343 can be sequentially disposed in the direction in which air flows, and can be connected to each other via a refrigerant pipe 348 constituting a refrigerant circulation passage. Refrigerant can be transferred along the refrigerant pipe 348 by means of a compressor 345, which is positioned outside the exhaust passage 31, and the refrigerant pipe 348 can be provided with a pressure regulator 347 configured to regulate the pressure of the refrigerant.

As illustrated in FIG. 3, an air introduction hole 233 defined in the rear cover 23 of the drum 2 can include a plurality of holes that are arranged so as to surround the center of the rear cover 23 (i.e., the rotational center of the drum 2). In some implementations, the supply passage 32 can include a supply duct 321, which is provided at the fixed panel 151 so as to define a transfer path for the air discharged from the second duct 312, and a first passage-defining portion 323 and a second passage-defining portion 324, which serve to guide the air in the supply duct 321 toward the air introduction hole 233.

The supply duct 321 can be provided in such a manner that the fixed panel 151 is bent or angled in a direction away from the rear cover 23 so as to define a passage (an air transfer passage). Furthermore, the supply duct 321 can be configured so as to have a ring form surrounding the motor-mounting recess 152, and the second duct 312 can be connected to the circumferential surface of the supply duct 321.

The first passage-defining portion 323 can be configured so as to surround the outer circumferential surface of the ring constituted by the air introduction hole 233, and the second passage-defining portion 324 can be configured so as to surround the inner circumferential surface of the ring constituted by the air introduction hole 233.

The first passage-defining portion 323 and the second passage-defining portion 324 can be coupled to the rear cover 23, and can also be coupled to the supply duct 321. FIG. 3 illustrates the first and second passage-defining portions 323 and 324 coupled to the rear cover 23. In FIG. 3, the free end of the first passage-defining portion 323 can surround the outer circumferential surface of the passage (the ring-shaped passage) defined by the supply duct 321, and the free end of the second passage-defining portion 324 can surround the inner circumferential surface of the passage defined by the supply duct 321. The first passage-defining portion 323 and the second passage-defining portion 324 can be made of rubber or felt.

The motor 5, configured to rotate the drum 2, can include a stator 51, which is positioned in the motor-mounting recess 152 so as to generate a rotating field, and a rotor 52, which is rotated due to rotation of the rotating field. The rotational movement of the rotor 52 can be transmitted to the drum 2 via a power transmission unit 6 coupled to the fixed panel 151, and the stator 51 can be coupled to one of the fixed panel 151 and the power transmission unit 6. In some implementations, when the stator 51 is coupled to the power transmission unit 6, there is an advantage in maintenance of coaxiality between a rotor shaft 64 and a rotating shaft 65, which are provided at the power transmission unit 6 (it is possible to minimize vibration of the laundry treatment apparatus and deterioration of the durability of the power transmission unit 6).

In some implementations, to block the exposure of the motor 5 provided in the motor-mounting recess 152 to the outside (to thus improve the durability of the motor and to prevent the occurrence of an accident), the fixed panel 151 can be further provided with a cover panel 19 configured to block the exposure of the motor 5 to the outside. In addition, the cover panel 19 can be configured to have a shape capable of blocking the exposure of the supply duct 321 to the outside (a shape surrounding the supply duct 321). The reason for this is not only to reduce leakage of heat to the outside of the supply duct 321 but also to prevent an accident that may occur when a human body comes into contact with the supply duct 321.

The laundry treatment apparatus 100 can include a drive unit 10 configured to rotate the drum 20. The drive unit 10 can include the motor 5 configured to generate rotational force, and the power transmission unit 6 configured to transmit the rotational force to the drum 2. In some implementations, the rotor shaft 64 of the motor 5, which is rotated due to the rotation of the rotating field, can be connected to the power transmission unit 6 rather being directly connected to the drum 2, as illustrated in FIG. 3. The power transmission unit 6 can be connected to the drum 2 via the additional rotating shaft 65. The reason for this is to lower the rotational speed of the motor 5 via the power transmission unit 6 and to increase the torque of the motor 5.

Specifically, the drive unit 10 can include the stator 51, configured to generate a rotating field, and the power transmission unit 6 composed of the motor 5 including the rotor, which is rotated due to the rotation of the rotating field, the rotor shaft 64, which is positioned between the rear cover 23 and the motor 5 and which is coupled at one end thereof to the rotor 52 so as to be rotated therewith, the rotating shaft 65, which is coupled at one end thereof to a shaft bracket 27 so as to rotate the drum 2, and a gear unit G configured to transmit the rotational movement of the rotor shaft 64 to the rotating shaft 65.

FIGS. 4 and 5 illustrate an exemplary power transmission unit 6. The power transmission unit 6 can include a housing H (see FIG. 5) coupled to the fixed panel 151, the rotor shaft 64 rotatably coupled to the bottom surface of the housing H (the surface of the housing H that faces the rotor), the rotating shaft 65 rotatably coupled to the upper surface of the housing H (the surface of the housing H that faces the fixed panel), and the gear unit G (see FIG. 5), which is provided in the housing H so as to transmit the rotational movement of the rotor shaft 64 to the rotating shaft 65. The rotor shaft 64 can be implemented as a shaft, which is coupled at one end thereof to the rotor 52 and is positioned at the other end thereof in the housing H, and the rotating shaft 65 can be implemented as a shaft, which is coupled at one end thereof to the rear cover 23 and is positioned at the other end thereof in the housing H.

The housing H can be coupled to the fixed panel 151, and can be positioned in a space (the external space of the cabinet) isolated from the space in which the drum 2 is disposed. The reason for this is to improve the durability of the power transmission unit 6 by minimizing transmission of the heat in the cabinet (the heat generated from the drum or the drying unit) to the inside of the housing H.

The rotor shaft 64 can be coupled to the rotor 52 via the shaft coupler 54 shown in FIG. 3. The shaft coupler 54 can include a disc-shaped coupling body and a shaft-coupling hole, which is defined through the coupling body and is coupled to one end of the rotor shaft 64.

The rotating shaft 65 can be inserted into the fixed panel through hole 153, and can be coupled to the drum 2. The rear cover 23 can be provided with the shaft bracket 27 (see FIG. 3) to which the rotating shaft 65 is coupled. The reason for this is to distribute the stress applied to the center of the rear cover 23 during rotation of the rotating shaft 65.

In some implementations, to block drooping of the housing H and to minimize deformation of the motor-mounting recess 152, the housing H can be fixed to the fixed panel 151 via a transmitting bracket 61 and a housing coupler 612.

As illustrated in FIG. 3, the transmitting bracket 61 can have a bracket through hole 611 through which the rotating shaft 65 extends, and the housing coupler 612 can be implemented as a bolt connecting the housing H to the transmitting bracket 61. The transmitting bracket 61 can be made of the same material as the fixed panel 151, and can be made of a material having a strength greater than that of the fixed panel 151.

Although FIG. 3 illustrates that the transmitting bracket 61 is coupled to the surface of the fixed panel 151 that faces the rear cover 23, the transmitting bracket 61 can be coupled to the surface of the fixed panel 151 that faces the cover panel 19.

As illustrated in FIG. 5, the housing H can include a housing body 62, which is configured to have a hollow cylindrical form with an opening hole defined in the surface thereof that faces the fixed panel 151, and a housing cover 63, which is coupled to the housing body 62 and closes the opening hole.

The housing body 62 can have a reception space 622 in which the gear unit G is mounted. The reception space 622 can communicate with the outside via the opening hole. The reception space 622 can include a housing base 621a to which the rotor shaft 64 is coupled, and a housing circumferential wall 621b, which extends toward the housing cover 63 from the periphery of the housing base 621a.

As illustrated in FIG. 5, the housing body 62 can include a rotor shaft support 625, which extends toward the rotor 52 from the housing base 621a. The rotor shaft support 625 can be implemented as a pipe surrounding a rotor shaft through hole 626 defined through the housing body 62. For example, the rotor shaft through hole 626 can be defined through the rotor shaft support 625 so as to communicate with the reception space 622.

The rotor shaft 64, which is inserted into the rotor shaft through hole 626, can be rotatably supported by the rotor shaft support 625 via rotor shaft bearings 628 and 629. The rotor shaft bearings can include a first rotor shaft bearing 628 and a second rotor shaft bearing 629, which is coupled in the rotor shaft through hole 626 so as to be positioned between the first rotor shaft bearing 628 and the rotor 52.

The free end of the rotor shaft support 625 can be inserted into a coupling body bent portion 542 provided at the shaft coupler 54. The length of the rotor shaft support 625 must be increased in order to hold the two rotor shaft bearings 628 and 629. Accordingly, when the free end of the rotor shaft support 625 is inserted into the coupling body bent portion 542, there is an effect of minimizing the amount of space required to mount the motor 5 and the power transmission unit 6 (the volume of the laundry treatment apparatus).

The housing cover 63 can be configured to have any form capable of opening and closing the opening hole defined in the housing body 62. FIG. 5 illustrates that the housing cover 63 can include a disc-shaped cover body 631. The housing cover 63 can be coupled to the housing body 62 via a cover-fixing plate 623 provided on the housing circumferential wall 621b.

The housing cover 63 can include a rotating shaft support 635, which extends toward the fixed panel 151 from the cover body 631, a rotating shaft through hole 632, which is defined through the rotating shaft support 635 and into which the rotating shaft 65 is inserted, and rotating shaft bearings 638 and 639, which are provided at the rotating shaft support 635 so as to rotatably hold the rotating shaft 65 in the rotating shaft through hole 632.

The housing cover 63 can include a mounting portion 637, which is provided at the cover body 631 and to which the stator 51 is coupled. Although the mounting portion 637 may be configured to have any form capable of being coupled to a stator coupler (for example, a bolt or the like), the drawing illustrates that the mounting portion 637 is configured to have a hollow cylindrical form.

The mounting portion 637 can include a plurality of mounting portions, which are arranged along the circumferential surface of the cover body 631, and the stator bracket 515 can include the same number of stator brackets as the mounting portion 637.

When the mounting portion 637 is configured to have a cylindrical form that projects toward the rotor 52 from the cover body 631, the cover-fixing plate 623 can have a fixing plate through hole 624 into which the mounting portion 637 is inserted. The reason for this is to minimize the outside diameter of the cover-fixing plate 623 (i.e., to minimize the amount of space required to mount the housing).

In some implementations, to increase the strength of the housing cover 63, the cover body 631 can include a bent portion 634, which is provided by a region including the rotating shaft through hole 632 projecting toward the fixed panel 151.

The rotating shaft bearings can include a first rotating shaft bearing 638 and a second rotating shaft bearing 639, which are coupled to the rotating shaft support 635 and are positioned in the rotating shaft through hole 632. In some implementations, in order to block external air from being supplied to the rotating shaft bearings 638 and 639, the housing cover 63 can further include a seal 633, which is coupled to the rotating shaft support 635 so as to close the rotating shaft through hole 632.

The housing H can be coupled to the fixed panel 151 via the housing coupler 612, and the stator 51 can be coupled to the housing H by inserting the stator coupler into a coupler through hole 516 and fixing the same to the mounting portion 637. The rotor 52 can be coupled to the housing H via the rotor shaft 64. For example, because the stator 51 and the rotor 52 are coupled to the housing H (i.e., because the stator 51 and the rotor 52 vibrate together with the housing H), it is possible to minimize deterioration of coaxiality between the rotor shaft and the rotating shaft 65.

The gear unit G can include a ring gear 66, which is coupled to the housing circumferential wall 621*b* and is positioned in the reception space 622, a drive gear 69, which is coupled to the rotor shaft 64 and is positioned in the reception space 622, a cage 67, which is positioned in the reception space and to which the other end of the rotating shaft 65 is coupled, and a driven gear 98, which is rotatably coupled to the cage 67 so as to connect the drive gear 69 to the ring gear 66.

As illustrated in FIG. 6, in some implementations, in order to minimize the risk of separation of the rotor shaft bearings 628 and 629 or the rotor shaft support 625 due to application of external force to the rotor shaft 64, the laundry treatment apparatus 100 can include a damper 9.

The damper 9 can be provided in the rotor shaft through hole 626 so as to be positioned between the first rotor shaft bearing 628 and the second rotor shaft bearing 629, in order to attenuate vibrations of the first rotor shaft bearing 628 transmitted to the second rotor shaft bearing 629.

The damper 9 can be implemented as an elastic body (for example, rubber or the like), which is coupled to the circumferential surface of the rotor shaft 64 and is positioned between the first rotor shaft bearing 628 and the second rotor shaft bearing 629. As illustrated in FIG. 5, the damper 9 can include a damping body 91 having a diameter larger than the diameter of the rotor shaft 64 but smaller than the diameter of the rotor shaft through hole 626 (i.e., a damping body having a diameter smaller than the outside diameter of the rotor shaft bearing), and a damping body through hole 92, which is defined through the damping body 91 and into which the rotor shaft 64 is inserted.

As illustrated in FIG. 6, in some implementations, in order to minimize vibration of the housing H, one end of the damping body 91 can be in contact with the first rotor shaft bearing 628, and the other end of the damping body 91 can be in contact with the second rotor shaft bearing 629.

The rotor shaft support 625 can further include a stopper (first stopper) 627, which projects from the center of the rotor shaft through hole 626 and is positioned between the first rotor shaft bearing 628 and the second rotor shaft bearing 629. The first stopper 627 can serve as means for limiting the range within which the first rotor shaft bearing 628 moves toward the second rotor shaft bearing 629 or the range within which the second rotor shaft bearing 629 moves toward the first rotor shaft bearing 628.

Because the damping body 91 is coupled to the circumferential surface of the rotor shaft 64 (because the damping body 91 is rotated together with the rotor shaft 64), the radius of the damping body 91 (the outside radius of the damper) may be set to be less than the distance between the center of the rotor shaft through hole 626 and the first stopper 627.

In some implementations, in order to minimize the risk of the rotating shaft bearings 638 and 639 being separated from the housing H due to application of external force to the rotating shaft 65, the rotating shaft support 635 can include a stopper (a second stopper) 635*c* for limiting the range within which the first rotating shaft bearing 638 and the second rotating shaft bearing 639 move.

In some implementations, in order to minimize the amount of heat that is transmitted to the inside of the housing H and to radiate heat of the housing H to the outside, the laundry treatment apparatus can further include a radiating unit 8. As illustrated in FIG. 5, the radiating unit 8 can include at least one of a first radiator 81, which is disposed at the coupling body 541 so as to discharge the air between the housing body 62 and the rotor 52 to the outside of the rotor 52, or a second radiator 82, which is disposed on the circumferential wall 621*b* of the housing body 62 so as to radiate the heat in the reception space 622 to the outside of the reception space 622.

The first radiator 81 can be implemented as a blade projecting toward the housing base 621*a* from the coupling body 541. Because the coupling body 541 and the first radiator 81 are rotated when the rotor 52 rotates, the air between the rotor 52 and the housing body 62 can be discharged to the outside of the rotor 52 through the rotor through hole 531 while the temperature of the housing H is lowered.

Although FIG. 5 illustrates that the first radiator 81 is composed of a plurality of blades, which are radially arranged about a shaft-coupling hole 543, the first radiator 81 can also be composed of a single blade provided at the coupling body 541.

When the coupling body 541 includes the coupling body bent portion 542, the first radiator 81 can be implemented as a blade, which extends to the periphery of the coupling body 541 from the coupling body bent portion 542. Consequently, because the height of the blade (the length of the blade in a direction toward the housing body from the coupling body) increases, there is an effect of increasing the amount of air that is discharged.

The second radiator 82 can be implemented as at least one of a housing projection projecting from the housing circumferential wall 621b (for example, a cooling fin or the like) or a housing bent portion, which is bent or angled toward the reception space 622 from the housing circumferential wall 621b (for example, a bent groove or the like). Because the second radiator 82 increases the surface area of the housing circumferential wall 621b, it is possible to enable the housing body 62 to easily exchange heat with external air.

FIG. 7A is a diagram illustrating the drum 2 provided in the laundry treatment apparatus 100. Referring to FIG. 7A, the drum 2 can include the cylindrical drum body 21 and the rear cover 23 defining the rear surface of the drum body 21. The drum body 21 can include the lifter 24. The lifter 24 can be implemented as a board, which extends toward the rear cover 23 from the front cover 22 and projects toward the rotational center of the drum 2 from the drum body 21 (i.e., which projects toward the rotational center from the circumferential surface of the drum 2).

The inner circumferential surface of the drum body 21 can be embossed. Specifically, the inner circumferential surface of the drum body 21 can have curved recesses, which are depressed toward the outer circumferential surface of the drum body 21 and are repeatedly arranged at regular intervals. The depressed recesses can include first-type recesses each having a larger radius and second-type recesses each having a smaller radius. Each of the second-type recesses can be positioned between adjacent first-type recesses.

Although the lifter 24 may be configured to have the form of a flat plate, the lifter 24 can be configured to have the form of a curved plate having a corrugated surface. For example, the lifter 24 can be curved so as to become concave moving toward the rear end from the front end of the drum 2 and then to become convex from an inflection point. The reason for this is to move laundry rearwards rather than forwards in order to efficiently dry the laundry using hot air introduced from the air introduction hole 233 in the rear cover 23.

The lifter 24 can include at least one lifter provided on the inner circumferential surface of the drum body 21.

The air introduction hole 233, which is provided at the rear cover 23 of the drum 2, can be implemented as a plurality of holes, which are arranged so as to surround the center of the rear cover 23 (i.e., the rotational center of the drum 2). As described above, the supply passage 32 can include the supply duct 321, which is provided at the fixed panel 151 so as to define the transfer passage for the air discharged from the second duct 312, and the first passage-defining portion 323 and the second passage-defining portion 324, which are configured to guide the air in the supply duct 321 to the air introduction hole 233.

The drum 2 can include a protective cover 25 configured to block the exposure of the shaft bracket 27 and the rotating shaft 65 to a laundry reception space 211 from the center of the rear cover 23.

FIG. 7B illustrates a portion of the shaft bracket 27, the rotating shaft 65, a rotating-shaft-coupling member 26, and a bracket-coupling member 225, which are exposed when the protective cover 25 is removed.

The laundry treatment apparatus can include the drum 2, which includes the cylindrical drum body 21 and the rear cover 23 defining the rear surface of the drum body 21 and receives laundry therein, the drive unit 10 including the rotating shaft configured to rotate the drum 2, a rear cover through hole 231 defined through the rear cover 23 in the axial direction of the rotating shaft 65, the shaft bracket 27 coupled to the rotating shaft 65 so as to close the rear cover through hole 231, and the protective cover 25, which is positioned at the rear cover 23 so as to block the shaft bracket 27 and the rotating shaft 65 from coming into contact with the laundry.

Accordingly, when the protective cover 25 is removed, the shaft bracket 27 and the rotating shaft 65 may be exposed. Although the shaft bracket 27 and the rotating shaft 65 are made of metal, scratches and the like may be formed due to accessories or a zipper attached to laundry, and rust may be generated due to wet laundry. In some implementations, in order to prevent these problems, the protective cover 25 can be provided. The protective cover 25 can be made of plastic. The protective cover 25 can be configured to have the form of a dome in order to shield the shaft bracket 27 and the rotating shaft 65. Specifically, the protective cover 25 can be depressed in an axial direction away from the rear cover 23. Consequently, the rear surface of the protective cover 25, that is, a protective cover rear surface 259 can cover a predetermined region around the center of the through hole 231. The predetermined region, which is covered by the protective cover 25, can be the region of the rear cover 23 including the rear cover through hole 231, which is shielded by the protective cover 25 and is thus not exposed to the outside.

FIG. 7A illustrates that the predetermined region, which is covered by the protective cover 25, may include the bracket-coupling member 225 configured to couple the shaft bracket 27 to the rear cover 23. Unlike this, the protective cover 25 may expose the bracket-coupling member 225 and may shield the rear cover through hole 231 and only a portion of the region around the rear cover through hole 231, as illustrated in FIG. 12.

FIG. 8A illustrates an exemplary rear cover 23. The rear cover 23 can include the rear cover through hole 231 (see FIG. 9) defined in the center thereof, in which the shaft bracket 27 and the rotating shaft 65 are inserted and coupled. The rear cover through hole 231 can be defined through the rear cover 23 in the axial direction of the rotating shaft 65. The rotating shaft 65 can be connected to the drum 2 for rotation of the drum 2. Accordingly, the rotating shaft 65 can be coupled to the shaft bracket 27 provided in the center of the rear cover 23, and the shaft bracket 27 can be coupled to the rear cover 23, thereby closing the rear cover through hole 231.

Referring to FIGS. 8A and 9, the protective cover 25 can be coupled to the rotating shaft 65. The protective cover 25 may include a cover-coupling hole 251, which is defined through the center of the protective cover 25 in the axial direction. By virtue of the cover-coupling hole 251, the protective cover 25 and the rotating shaft 65 can be coupled to each other by means of a protective-cover-fastening member 255.

The protective-cover-fastening member 255 can be a fastening member such as a screw. The portion of the protective cover 25 around the cover-coupling hole 251 can be depressed so as to correspond to the size of the protective-cover-fastening member 255 such that the head portion of the protective-cover-fastening member 255, that is, the head of the screw does not project from the protective cover 25. The reason for this is to reduce damage to laundry caused by the projecting head portion.

The thread of the protective-cover-fastening member 255 can be provided in a direction such that the rotating shaft 65 and the protective cover 25 are more tightly fastened to each other when the protective-cover-fastening member 255 rotates in the same direction as the drum 2. The reason for this is to block the protective-cover-fastening member 255 from being loosened and separated from the rotating shaft and to thus block the rear cover 23 from being separated from the protective cover 25 during rotation of the drum 2.

The rotating shaft 65 can be coupled to the rear cover 23 via the shaft bracket 27, and the protective cover 25 can be coupled to the rotating shaft 65. Accordingly, because the rear cover 23 and the protective cover 25 rotate at the same speed when the rotating shaft 65 rotates, there is no slippage or friction due to the speed difference between the rear cover 23 and the protective cover 25.

Referring to FIG. 11A, the rear cover 23 can include the rear cover through hole 231, which is defined in the center thereof and into which the shaft bracket 27 is inserted, a plurality of shaft-bracket-coupling holes 232 arranged around the rear cover through hole 231 at regular intervals, and a shaft bracket coupler 235, which includes the rear cover through hole 231 and the plurality of shaft-bracket-coupling holes 232 and bulges forwards to form a region to which the protective cover 25 is coupled.

The shaft bracket coupler 235 can project in the forward direction of the drum 2 further than the air introduction hole 233. The reason for this is to reduce the volume occupied by the drive unit 10 when the drive unit 10 is positioned behind the drum 2. Specifically, the drive unit, particularly, the rotating shaft 65 of the power transmission unit can project forwards, and the projecting portion can be received in a rotating shaft reception space 279, which is defined by the depressed portion of the shaft bracket coupler 235. Because the rotating shaft 65 and the shaft bracket 27 are received in a rear surface recess 2311 (see FIG. 11B) provided in a rear coupling surface 2352 that is the rear surface of the rear cover 23, it is possible to reduce the overall size of the structure for coupling the drum 2 to the drive unit 10.

The rear cover 23 can include a plurality of rear-cover-reinforcing ribs 237, which extend radially from the shaft bracket coupler 235 like spokes and are connected to the periphery of the rear cover 23. The plurality of rear-cover-reinforcing ribs 237 can increase the strength of the rear cover 23. A plurality of air introduction holes 233 can be defined through the rear cover 23 between respective ones of the plurality of rear-cover-reinforcing ribs 237.

FIG. 10A illustrates the shaft bracket 27, which is coupled to the rear cover 23 so as to close the rear cover through hole 231. The shaft bracket 27 can be inserted into the rear cover through hole 231, and can have a shaft-coupling hole 271, which is defined through the shaft bracket 27 so as to allow the rotating shaft 65 to project into the drum 2. The shaft bracket 27 can be configured to project toward the rear cover 23. The shaft-coupling hole 271 can be positioned at the projecting portion of the shaft bracket 27.

FIG. 8B illustrates a cross-section of an assembly in which the rear cover 23, the shaft bracket 27, the rotating shaft 65, and the protective cover 25 are coupled to each other. The rotating shaft 65 can be coupled into the shaft-coupling hole 271. The rotating shaft 65 can include a rotating shaft flange 655 (see FIG. 9), which extends radially from the outer circumferential surface of the rotating shaft

65, in order to block the rotating shaft 65 from being inserted into the shaft-coupling hole 271 beyond a predetermined point when the rotating shaft 65 is inserted into the shaft-coupling hole 271 beyond a predetermined distance. For example, the rotating shaft flange 655 may serve as a guide for assembly when the rotating shaft 65 is inserted into the shaft bracket 27.

The shaft bracket 27 can be coupled to the rear cover 23. The shaft bracket 27 can be coupled to the shaft bracket coupler 235. As described above, in the case in which the shaft bracket is configured so as to project in the forward direction of the rear cover 23, the portion of the shaft bracket 27 that includes the shaft-coupling hole 271 can be inserted into the rear cover through hole 231 and can project into the drum 2 when the shaft bracket 27 is coupled to the rear cover 23.

Accordingly, when the rotating shaft 65 is coupled to the shaft bracket 27, a predetermined portion of the rotating shaft 65 can project into the drum 2.

FIG. 8C illustrates a cross-section of a structure in which the rotating shaft 65 of the power transmission unit 6 is inserted into the shaft-coupling hole 271 and projects therefrom and the shaft bracket 27 is inserted into the rear cover through hole 231 and projects therefrom.

The protective cover 25 can have the cover-coupling hole 251, which is defined through the center thereof in the axial direction. The rotating shaft 65 can have a cover-positioning hole 653 defined axially in the end of the rotating shaft 65 that is inserted into the drum 2 so as to correspond to the cover-coupling hole 251. The protective-cover-fastening member 255 can be threaded into the cover-positioning hole 653 through the cover-coupling hole 251 so as to couple the protective cover 25 to the rotating shaft 65.

The protective cover 25 can be connected to the rotating shaft 65 in any manner other than the threading manner, as long as the protective cover 25 is capable of being coupled to the rotating shaft 65 and rotated therewith. Because the reason why the protective cover 25 is coupled to the rotating shaft 65 is to enable the protective cover 25 to rotate at the same speed as the drum 2, the protective cover 25 may also be coupled to the rear cover 23 rather than the rotating shaft 65.

Referring to FIG. 8B, the outside diameter C1 of the protective cover 25 can be greater than the inside diameter C2 of the rear cover through hole 231. Because the protective cover 25 is intended to block the exposure of at least the shaft bracket 27 and the rotating shaft 65, the protective cover 25 may have a size sufficient to cover the rear cover through hole 231.

As described above, the rear cover 23 can have a plurality of shaft-bracket-coupling holes 232, which is defined around the rear cover through hole 231 for coupling to the shaft bracket 27.

FIG. 8B illustrates that the plurality of shaft-bracket-coupling holes 232 is an even number of shaft-bracket-coupling holes and each pair of shaft-bracket-coupling holes that diametrically face each other maintain the maximum distance D2 therebetween. Because the multiple shaft-bracket-coupling holes 232 are arranged on a concentric circle about the rear cover through hole 231, the minimum distance D1 and the maximum distance D2 may be obtained based on the distance between each pair of shaft-bracket-coupling holes 232 that are diametrically opposed to each other in consideration of the diameter of the shaft-bracket-coupling holes 232.

Because half of the outside diameter C2 of the protective cover 25 is greater than the maximum distance among the distances between the center of the rear cover 23 and the plurality of shaft-bracket-coupling holes 232 (half of D2) even when the number of the shaft-bracket-coupling holes 232 is an odd number, it is possible to block the exposure of the rear cover through hole 231 and the plurality of shaft-bracket-coupling holes 232.

Referring to FIG. 8B, the shaft bracket coupler 235 can be depressed or elevated in the forward direction of the drum 2 from the rear surface of the rear cover 23 (the rightmost surface in FIG. 8B) by a first predetermined distance R1. When the shaft bracket 27 can be coupled to the region of the rear cover 23 around the rear cover through hole 231, the shaft bracket 27 can project into the drum 2 from the rear surface of the rear cover 23 by a second predetermined distance R2. Accordingly, because the shaft bracket coupler 235 is elevated by the first distance R1, the shaft bracket 27 can project into the drum 2 by the difference between the second distance R2 and the first distance R1 (R2-R1).

For example, the shaft bracket 27 can have the shaft-coupling hole 271, which is defined therethrough in the axial direction, and the rotating shaft 65 can be coupled to the shaft bracket 27 through the shaft-coupling hole 271 and can be inserted into the drum 2.

Referring to FIG. 8C, the protective cover 25 can include a protective cover rear surface 259, which faces the rear cover 23, and at least one cover hook 2591, which projects in the axial direction from the protective cover rear surface 259 and is inserted into the inner circumferential surface of the rear cover through hole 231 so as to be coupled thereto in a hooking manner. The cover hook 2591 can block the protective cover 25 from being separated from the rear cover through hole 231, and can be in close contact with the rear cover 23. Consequently, laundry can be blocked from being jammed between the rear cover 23 and the cover hook 2591.

The protective cover 25 can further include a cover-reinforcing rib 252, which is positioned on the protective cover rear surface 259 so as to radially surround the cover hook 2591 and to support the protective cover 25. Because the protective cover 25 is configured to have a dome form, which is depressed in a particular direction, the protective cover 25 can have reduced strength. In some implementations, in order to compensate for the reduction in strength, the protective cover 25 can include the cover-reinforcing rib 252. In some implementations, in order to block the exposure of the cover-reinforcing rib 252 to the outside, the cover-reinforcing rib 252 can be provided at the protective cover rear surface 259.

The cover-reinforcing rib 252 can include a plurality of cover-reinforcing ribs, which are concentrically arranged about the cover-coupling hole 251.

FIG. 9 is a diagram illustrating an exploded view of main components assembled with the rear cover.

The protective cover 25 can have the cover-coupling hole 251, which is defined through the center thereof in the axial direction. The rotating shaft 65 can have the cover-positioning hole 653, which is defined in the axial direction in the end thereof that is inserted into the drum 2 so as to correspond to the cover-coupling hole 251. The fastening member 255 can be threaded in the cover-positioning hole 653 through the cover-coupling hole 251.

As described above, when the shaft bracket 27 is coupled to the rear cover 23, a portion of the shaft bracket 27 can be inserted into the drum 2 through the rear cover through hole 231. For example, the rotating shaft 65 can be inserted into the shaft-coupling hole 271, can be coupled to the shaft bracket 27, and can project into the drum 2.

The rotating shaft 65 can include the rotating shaft flange 655, which extends radially from the outer circumferential surface of the rotating shaft 65, a rotating shaft insertion portion 651 including a rotating shaft thread 6511, which is provided in the outer circumferential surface thereof between the end of the rotating shaft 65 that is inserted into the shaft-coupling hole 271 and the rotating shaft flange 655, and a rotating shaft transmission portion 657 coupled to the shaft bracket 27 between the rotating shaft thread 6511 and the rotating shaft flange 655. When the rotating shaft 65 is coupled to the shaft bracket 27 and the rear cover 23, the rotating shaft insertion portion 651 can be inserted into the shaft-coupling hole 271, and can project into the drum 2.

When the rotating shaft 65 is coupled to the shaft-coupling hole 271, the rotating shaft flange 655 can come into contact with the rear surface of the shaft bracket 27, thereby blocking the rotating shaft 65 from being further inserted.

Because the outside diameter of the shaft bracket 27 is larger than the inside diameter of the rear cover through hole 231, the shaft bracket 27 can be coupled to the rear surface of the rear cover 23 while closing the rear cover through hole 231.

The radius of the shaft-coupling hole 271 may be smaller than the radius of the rotating shaft flange 655 but may be equal to or larger than the radius of the rotating shaft insertion portion 651. Therefore, the rotating shaft insertion portion 651 can freely pass through the shaft-coupling hole 271 but may not pass through the rotating shaft flange 655. The shaft bracket coupler 235 can be configured to have a shape corresponding to the shape of the shaft-coupling hole 271. Accordingly, when the inner circumferential surface of the shaft-coupling hole 271 has, for example, a serrated shape, the outer circumferential surface of the shaft bracket coupler 235 can be provided with a serrated shape corresponding to the serrated shape of the shaft-coupling hole 271 so as to be engaged therewith.

The reason for this is because the rotating shaft insertion portion 651 must be coupled to the shaft-coupling hole 271 so as to transmit the rotational force of the rotating shaft 65 to the shaft bracket 27. Accordingly, in some implementations, in order to transmit the rotational force without slipping therebetween, the corresponding surfaces between the rotating shaft insertion portion 651 and the shaft-coupling hole 271 may have corresponding toothed or serrated forms.

The outer circumferential surface of the rotating shaft insertion portion 651 can be provided with the rotating shaft thread 6511. The reason for this is to couple the shaft bracket 27 to the rotating shaft 65 via a coupling nut or a rotating-shaft-coupling member 26 when the rotating shaft insertion portion 651 is inserted into the shaft-coupling hole 271 and projects into the drum 2.

The rotating-shaft-coupling member 26 can also be received in the protective cover 25 so as not be exposed by virtue of the depressed shape of the protective cover 25.

The protective cover 25 can have the cover-coupling hole 251 defined through the center thereof. The rotating shaft 65 can have the cover-positioning hole 653, which is defined in the axial direction in the end of the rotating shaft 65 that is inserted into the drum 2 so as to correspond to the cover-coupling hole 251. Accordingly, the protective cover 25 can be coupled to the rotating shaft 65 through the cover-coupling hole 251 and the cover-positioning hole 653.

The protective cover 25 can be coupled to the rotating shaft 65 in any manner other than in the screwing manner as long as the protective cover 25 is capable of being coupled to the rotating shaft 65 and rotated therewith. Because the protective cover 25 is coupled to the rotating shaft 65 to cause the protective cover 25 to be rotated at the same speed as the drum 2, the protective cover 25 can be coupled to the rear cover 23 rather than the rotating shaft 65.

When the rotating shaft insertion portion 651 is coupled to the shaft-coupling hole 271, a rotating shaft washer 28 can further be interposed between the rotating shaft flange 655 and the shaft bracket 27. When the rotating shaft washer 28 is fitted over the rotating shaft 65 and the rotating shaft insertion portion 651 is coupled to the shaft-coupling hole 271, the rotating shaft washer 28 can be positioned between the rotating shaft flange 655 and the shaft bracket 27. The rotating shaft washer 28 can serve to reduce frictional force generated between the rotating shaft flange 655 and the shaft bracket 27 when the rotating shaft 65 is engaged with the shaft bracket 27 and rotated therewith.

FIGS. 10A and 10B are diagrams illustrating the shaft bracket 27 when viewed from the front and the rear, respectively. The shaft bracket 27 can include a shaft coupler 278, which has the shaft-coupling hole 271, in which the rotating shaft 65 is coupled, and which defines the central portion of the shaft bracket 27, a shaft bracket flange 275, which extends in a radially outward direction of the shaft coupler 278 and is coupled to the rear cover 23, and a shaft bracket sloping portion 277 obliquely extending between the shaft coupler 278 and the shaft bracket flange 275 and connecting the shaft coupler 278 and the shaft bracket flange 275 to each other.

In some implementations, the shaft bracket 27 can include the ring-shaped shaft coupler 278 having the shaft-coupling hole 271, the shaft bracket flange 275, which is radially spaced apart from the shaft coupler 278 based on the shaft-coupling hole 271 and is coupled to the rear cover 23, and the shaft bracket sloping portion 277, which obliquely extends between the shaft coupler 278 and the shaft bracket flange 275 and connects them to each other.

The shaft coupler 278 can be configured to have a ring-shaped flat plate having the shaft-coupling hole 271 defined through the center thereof. The ring-shaped flat plate (or the ring flat plate) can serve as a stopper which catches on the rotating shaft flange 655 when the rotating shaft 65 is inserted into the shaft-coupling hole 271.

The inner circumferential surface of the shaft-coupling hole 271 can have a serrated shape or a toothed shape. The outer circumferential surface of the rotating shaft insertion portion 651 of the rotating shaft 65 can also have a shape corresponding to the serrated or toothed shape of the shaft-coupling hole 271 such that the rotating shaft 65 is engaged with the shaft-coupling hole 271 so as to transmit rotational force. The shaft coupler 278 including the shaft-coupling hole 271 can project in the forward direction of the drum 2 further than other portion of the shaft bracket 27. Consequently, the shaft coupler 278 can be inserted into the rear cover through hole 231, and can be coupled to the rotating shaft 65, thereby reducing the size of the assembly of the drum 2 and the drive unit 10.

When the shaft coupler 278 including the shaft-coupling hole 271 is positioned in the center of the shaft bracket 27, the shaft bracket flange 275, which is provided in a radial direction of the shaft-coupling hole 271, can have a plurality of rear-cover-coupling hole 272 defined through the shaft bracket flange 275 for coupling to the rear cover 23.

Referring to FIG. 9, the rear cover 23 can have the plurality of shaft-bracket-coupling holes 232, which are arranged around the rear cover through hole 231 so as to respectively correspond to the plurality of rear-cover-coupling holes 272. The rear cover 23 and the shaft bracket 27 can be coupled to each other by means of the bracket-coupling member 225 after the plurality of shaft-bracket-coupling holes 232 are respectively aligned with the plurality of rear-cover-coupling holes 272.

The shaft bracket sloping portion 277 can include a first sloping portion 2771 (See FIG. 10A), which radially and obliquely extends from the shaft coupler 278, and a second sloping portion 2772 (See FIG. 10A), which radially extends from the first sloping portion 2771 and is connected to the shaft bracket flange 275.

Referring to FIG. 10A, the first sloping portion 2771 can be inclined outwards moving in a direction away from the rear cover 23 in the axial direction. For example, the first sloping portion 2771 can be configured so as to increase in cross-sectional area moving radially outwards from the shaft-coupling hole 671. By way of further example, the first sloping portion 2771 can be configured to have a cone-shaped outer surface having a cross-sectional area, which increases moving radially from the shaft-coupling hole 671. In some implementations, the second sloping portion 2772 can be inclined in a direction opposite the direction in which the first sloping portion 2771 is inclined, and can connect the first sloping portion 2771 to the shaft bracket flange 275.

The portion of the shaft bracket 27 at which the first sloping portion 2771 is connected to the second sloping portion 2772 can be positioned so as to be closer to the motor 5 than to the rear cover 23 based on the shaft bracket flange 275. Accordingly, when the shaft bracket 27 is placed on the ground surface, the portion of the shaft bracket 27 at which the first sloping portion 2771 is connected to the second sloping portion 2772 can come into contact with the ground surface.

Referring to FIGS. 8C and 10B, the first cone-shaped sloping portion 2771, which increases in cross-sectional area moving away from the shaft-coupling hole 271, can define the rotating shaft reception space 279 capable of accommodating the rotating shaft 65 when viewed from the rear. The reason for this is to correspond to the contour of the power transmission unit 6 and to thus minimize the space occupied by the power transmission unit 6. For example, the rotating shaft reception space 279 can accommodate the rotating shaft 65 connected to the power transmission unit 6, the housing cover 63, and a portion of an insulator.

Because the portion of the shaft bracket 27 at which the first sloping portion 2771 is connected to the second sloping portion 2772 is positioned so as to be closer to the motor 5 than to the rear cover 23 based on the shaft bracket flange 275, the first sloping portion 2771 and the second sloping portion 2772 can define a shaft bracket recess 276. For example, the shaft bracket recess 276 can be a depressed portion defined between the first sloping portion 2771 and the shaft bracket flange 275.

Referring to FIG. 8B, the distance B2 between the cover hook 2591 and the shaft bracket recess 276 may be greater than the distance B1 between the cover hook 2591 and the shaft bracket flange 275.

The shaft bracket recess 276 can accommodate the hook portion when the cover hook 2591 is engaged with the rear cover through hole 231. For example, the inner circumferential surface of the rear cover 23 may not be formed by merely forming a circular hole in the rear cover 23 by cutting the rear cover 23 but may be formed by forming a circular hole in the rear cover 23 by cutting the rear cover 23 and then bending a portion of the inner circumferential surface of the rear cover through hole 231 that corresponds to the cover hook 2591 in a direction of the rear surface of the rear cover 23. Accordingly, there is a need to design the shaft bracket 27 in consideration of the case in which the cover hook 2591 is engaged with the rear cover through hole 231. To this end, the shaft bracket 27 can include the shaft bracket recess 276.

Referring to FIG. 10B, the plurality of rear-cover-coupling holes 272 can be depressed toward the rear surface of the shaft bracket 27. The reason for this is to minimize projection of the head of the bracket-coupling member 225 from the shaft bracket 27 when the plurality of shaft-bracket-coupling holes 232 are aligned with the plurality of rear-cover-coupling holes 272 and are coupled thereto via the bracket-coupling member 225. When the dome-shaped protective cover 25 is coupled to the rear cover 23, the bracket-coupling member 225 will be positioned at the highest portion of the protective cover 25 rather than at the center of the protective cover 25. The reason for this is because the height of the peripheral portion of the protective cover 25 is lower than the height of the central portion of the protective cover 25 and thus because the bracket-coupling member 225 may interfere with the protective cover 25 when the bracket-coupling member 225 excessively projects.

FIGS. 11A and 11B are diagram illustrating views of the rear cover 23 when viewed from the front surface and the rear surface thereof. Referring to FIG. 11A, the rear cover 23 can include the rear cover through hole 231 defined in the center thereof, through which the shaft bracket 27 is inserted, the plurality of shaft-bracket-coupling holes 232, which are defined through the rear cover 23 and are arranged around the rear-cover-coupling hole 272 at regular intervals, and the shaft bracket coupler 235, which has the rear cover through hole 231 and the plurality of shaft-bracket-coupling holes 232 defined in the rear cover 23 and which is elevated in the forward direction of the drum 2 and is coupled to the protective cover 25.

The shaft bracket coupler 235 can project in the forward direction of the drum 2 further than the portion in which the air introduction hole 233 is defined. The reason for this is to reduce the volume occupied by the drive unit when the drive unit 10 is positioned behind the drum 2. For example, the rotating shaft 65 of the drive unit 10, particularly, the power transmission unit 6 can project forwards. The projecting portion can be received in the rotating shaft reception space defined by the depressed portion of the shaft bracket coupler 235. Subsequently, the rotating shaft 65 and the shaft bracket 27 can be received in the rear surface recess 2311 (see FIG. 11B) provided in the rear coupling surface 2352, which is the rear surface of the rear cover 23, thereby reducing the size of the assembly of the drum 2 and the drive unit 10.

The rear cover 23 can include the plurality of rear-cover-reinforcing ribs 237, which extend radially from the shaft bracket coupler 235 like spokes and are connected to the periphery of the rear cover 23. The rear-cover-reinforcing ribs 237 can increase the strength of the rear cover 23. The plurality of air introduction holes 233 can be defined through the rear cover 23 between the plurality of rear-cover-reinforcing ribs 237.

As described ab above, the supply duct 321, which is provided at the fixed panel 151 and defines the transfer passage for the air discharged from the second duct 312, can guide the air in the supply duct 321 to the air introduction hole 233 through the first passage-defining portion 323 and the second passage-defining portion 324.

The shaft bracket 27 can be coupled to the shaft bracket coupler 235. As described above, when the shaft bracket 27, which projects toward the rear cover 23, is coupled to the rear cover 23, the portion of the shaft bracket 27 including the shaft-coupling hole 271 can be inserted into the rear cover through hole 231 and can project into the drum 2.

The protective cover 25 can be coupled to a first coupling surface 2351, which defines the front surface of the shaft bracket coupler 235. The cover hook 2591 can be engaged with the rear cover through hole 231. For example, for engagement with the cover hook 2591, the portion of the inner circumferential surface of the rear cover through hole 231 that is engaged with the cover hook 2591, can be bent or angled toward the rear surface of the rear cover 23 such that the cover hook 2591 is engaged with the bent portion of the circumferential surface of the rear cover through hole 231. Accordingly, the shaft bracket 27, which is coupled to the rear coupling surface 2352, can include the shaft bracket recess 276.

As described above, in order to minimize projection of the head of the bracket-coupling member 225 from the shaft bracket 27 when the plurality of shaft-bracket-coupling holes 232 and the plurality of rear-cover-coupling holes 272 are coupled to each other by means of the bracket-coupling member 225, the plurality of shaft-bracket-coupling holes 232 can also be depressed. Accordingly, the plurality of rear-cover-coupling holes 272 can also be depressed.

Referring to FIGS. 11A and 11B, rear cover recesses 234, which are depressed toward the rear surface of the rear cover 23, can be provided between the plurality of rear-cover-reinforcing ribs 237. The plurality of air introduction holes 233 can be positioned at the rear cover recesses 234. The reason for this is because the air introduction holes 233 can be blocked by laundry during rotation of the drum 2 when the air introduction holes 233 are positioned at same surface as the rear-cover-reinforcing ribs 237. In addition, in order to swirl hot air introduced through the air introduction holes 233, it is advantageous that the rear-cover-reinforcing ribs 237 and the air introduction holes 233 are provided in the same level rather than in different levels.

The rear coupling surface 2352, which defines the rear surface of the shaft bracket coupler 235, can be coupled to the shaft bracket 27. For example, the shaft bracket flange 275 can be coupled to the rear coupling surface 2352.

The rear cover 23 can include a rear cover side surface defining the side surface thereof. The reason for this is to facilitate coupling of the rear cover 23 to the drum body 21.

FIG. 12 is a diagram illustrating another exemplary rear cover 23. The rear cover 23 can include the rear cover through hole 231 (see FIG. 9), through which the shaft bracket 27 and the rotating shaft 65 are inserted, and the plurality of shaft-bracket-coupling holes 232 defined around the rear cover through hole 231. The shaft bracket 27 can include the plurality of rear-cover-coupling holes 272, the number of which is the same as the number of shaft-bracket-coupling holes 232 so as to respectively correspond to the plurality of shaft-bracket-coupling holes 232. After the shaft bracket 27 and the rear cover 23 may be positioned such that the plurality of rear-cover-coupling holes 272 are aligned with the plurality of shaft-bracket-coupling holes 232, the shaft bracket 27 and the rear cover 23 can be coupled to each other by means of the bracket-coupling member 225. As a result, the shaft bracket 27 can be coupled to the rear cover 23, and can close the rear cover through hole 231.

The protective cover 25 can be configured to have a dome form so as to shield the shaft bracket 27 and the rotating shaft 65. For example, the protective cover 25 can be depressed in the axial direction away from the rear cover 23. Accordingly, the rear surface of the protective cover 25, that is, the protective cover rear surface 259 can cover a predetermined area defined about the center of the rear cover through hole 231.

The predetermined area of the rear cover through hole 231, which is covered by the protective cover 25, can refer to an area including the rear cover through hole 231, which is not exposed to the outside when the protective cover 25 covers the rear cover 23.

Referring to FIG. 7A, the predetermined area, which is covered by the protective cover 25, can be a circular area including the rear cover through hole 231 and the plurality of shaft-bracket-coupling holes 232. Accordingly, FIG. 7A illustrates that all of the shaft bracket 27, the rotating shaft 65, and the bracket-coupling member 225 are blocked from being exposed.

Unlike this, as depicted in FIG. 12, the periphery of the protective cover 25 is positioned between the rear cover through hole 231 and the plurality of shaft-bracket-coupling holes 232 so as to block exposure of the rear cover through hole 231 but to allow exposure of the plurality of shaft-bracket-coupling holes 232 to the outside.

The reason for this is because the plurality of the shaft-bracket-coupling holes 232 are aligned with the plurality of rear-cover-coupling holes 272 and are coupled thereto by means of bracket-coupling member 225 and thus the plurality of shaft-bracket-coupling holes 232 are closed by the bracket-coupling member 225. Therefore, it is difficult for the moisture contained in laundry to have an influence on the drive unit through the plurality of shaft-bracket-coupling holes 232. Consequently, although the protective cover 25 does not cover the plurality of shaft-bracket-coupling holes 232, the main function of the protective cover 25 of blocking exposure of the rotating shaft 65 and the shaft bracket 27 may not be deteriorated.

Accordingly, the periphery of the protective cover 25 can be positioned between the rear cover through hole 231 and the plurality of shaft-bracket-coupling holes 232 so as to block the exposure of the rear cover through hole 231 but to allow exposure of the plurality of shaft-bracket-coupling holes 232 to the outside, as illustrated in FIG. 12.

In some implementations, the radius of the protective cover 25, which is the half of the outside diameter of the protective cover 25, may be larger than the outside diameter of the rear cover through hole 231 but may be smaller than the minimum distance between the center of the rear cover 23 and the plurality of shaft-bracket-coupling holes 232.

However, in some implementations, in order to reduce damages on laundry caused by the projecting bracket-coupling member 225, the bracket-coupling member 225 does not project from the rear cover 23 when the plurality of shaft-bracket-coupling holes 232 are coupled to the plurality of rear-cover-coupling holes 272, which respectively correspond to the plurality of shaft-bracket-coupling holes 232, by means of the bracket-coupling member 225.

When the bracket-coupling member 225 is, for example, a screw, each of the plurality of shaft-bracket-coupling holes 232 and the plurality of rear-cover-coupling holes 272 corresponding to the shaft-bracket-coupling holes 232 may be depressed so as to correspond to the head of the screw such that the head of the screw is received in each of the plurality of shaft-bracket-coupling holes 232.

For example, the plurality of shaft-bracket-coupling holes 232 can be depressed toward the rear surface of the rear cover 23 so as to block the bracket-coupling member 225 from projecting from the rear cover 23.

FIGS. 13A and 14A are diagrams illustrating a conventional laundry treatment apparatus. As described above, a rotating shaft 465 can be inserted into a shaft bracket 47, and a shaft bracket flange 475 can be fixed to a rear cover 23. The rotating shaft 465 may be merely inserted into the shaft bracket 47 but may not project into the drum 2.

The shaft bracket 47 may include a shaft-coupling projection 4712, which is a portion of the inner circumferential surface of a shaft-coupling hole defined through the shaft bracket 47 and projects in the radial direction of the shaft-coupling hole to serve as a stopper. Accordingly, the rotating shaft 464 cannot be inserted into the shaft-coupling hole beyond a predetermined point by virtue of the shaft-coupling projection 4712. Therefore, the inner circumferential surface of the shaft-coupling hole, which is partitioned by means of the shaft-coupling projection 4712 and through which the rotating shaft 465 is inserted, may be configured to have a toothed or serrated cross-section. Because the portion of the rotating shaft 465 corresponding to the inner circumferential surface of the shaft-coupling hole has the same cross-section, it is possible to efficiently transmit the rotational force of the rotating shaft 465 to the shaft bracket 47 when the rotating shaft 465 is coupled to the shaft bracket 47.

A fastening bolt 46 may be inserted into the opening of the shaft-coupling hole, which is positioned opposite the opening of the shaft-coupling hole into which the rotating shaft 465 is inserted. For example, a screw hole capable of being engaged with the fastening bolt 46 may be formed in the center of the rotating shaft 465. When the fastening bolt 46 is inserted into the shaft bracket 47 in a direction, the fastening bolt 46 may be inserted into the shaft bracket 47 in the opposite direction and may be coupled thereto with the shaft-coupling projection 4712 interposed therebetween.

The rotating shaft 465 may be coupled to the shaft bracket 47, and may be coupled thereto by means of the fastening bolt 46, thereby fixing the rotating shaft 465 and the shaft bracket 47.

Here, it is preferable that the fastening bolt 46 has high fastening force. However, because the size of the fastening bolt 46 must be smaller than the rotating shaft 465, there is a problem in that the fastening bolt 46 has low fastening force. In other words, the fastening bolt 46 has low fastening force and rigidity. In the conventional laundry treatment apparatus, the shaft bracket 47 is dominantly made of a die-cast aluminum alloy. In this case, the die-cast aluminum alloy may be disadvantageous in terms of rigidity and costs of the shaft bracket.

Referring to FIG. 15A, because the conventional rotating shaft 465 is constructed such that a rotating shaft transmission portion 4657 and a rotating shaft flange 4655 have the same outside diameter and there is no portion for guiding assembly when the rotating shaft 465 is coupled to the shaft bracket, the assembly may require a great deal of time.

FIGS. 13B, 13C, and 13D and FIGS. 14B, 14C, and 14D are diagram illustrating various implementations of the rotating shaft 65, the shaft bracket 27, and the rotating-shaft-coupling member 26, which are configured so as to solve the above-mentioned problems.

Referring to FIGS. 13B, 13C, and 13D and FIGS. 14B, 14C, and 14D, the laundry treatment apparatus 100 can include the drum 2, which includes the cylindrical drum body 21 and the rear cover 23 defining the rear surface of the drum body 21 and receives laundry therein, the drive unit 10 including the rotating shaft 65, 865, or 965 configured to rotate the drum 2, the rear cover through hole defined through the rear cover 23 in the axial direction of the rotating shaft 65, 865, or 965, the shaft bracket 27, 87, or 97, which is coupled to the rear cover 23 and is coupled to the rotating shaft 65, 865, or 965 so as to close the rear cover through hole 231 and to transmit the rotational movement of the rotating shaft 65, 645, or 965 to the drum 2, and the shaft-coupling holes 271, 871, or 971, which is defined through the shaft bracket 27, 87, or 97 and into which the rotating shaft 65, 965 or 965 is inserted. The rotating shaft 65, 865 or 965 can be inserted into the shaft-coupling hole 271, 871, or 971 so as to project into the drum 2, and can be coupled to the shaft bracket 27, 87, or 97 by means of the rotating-shaft-coupling member 26, 86, or 96.

The rotating-shaft-coupling member 26, 86, or 96 can be configured to have a nut form. Specifically, the rotating-shaft-coupling member 26, 86, or 96 can be a hexagonal nut having a hexagonal head.

A screw-locking agent can be applied between the rotating-shaft-coupling member 26, 86 or 96 and the thread of the rotating shaft 65, 865, or 965 so as to block the screw from being loosened, in place of a washer or a U-ring.

The shaft bracket 27, 87, or 97 can be made of hot dip galvanized iron in place of die-cast aluminum in consideration of the rigidity thereof. The shape of the shaft bracket 27, 87, or 97 can be formed using a press.

The rotating shaft 65, 865, or 965 can be coupled to the shaft bracket 27, 87 or 97 and can be rotated therewith by coupling the rotating-shaft-coupling member 26, 86, or 96 to the rotating shaft 65, 865, or 965 a portion of which projects into the drum 2.

Here, because the fastening force of the rotating-shaft-coupling member 26, 86, or 96 is proportional to the diameter of the rotating shaft 65, 865, or 965, the rotating-shaft-coupling member 26, 86, or 96 may have a fastening force higher than that of the conventional fastening bolt 46.

The rotating shaft 65, 865, or 965 can include the rotating shaft insertion portion 651, 8651, or 9651, which is provided in the axial direction over a first length P1, V1 or Q1 of one end 65a, 865a, or 965a of the rotating shaft 65, 865, or 965 that is inserted into the shaft-coupling hole 271, 871, or 971 and which is provided on the outer circumferential surface thereof with a thread, and the rotating shaft transmission portion 657, 8657, or 9657, which is provided in the axial direction over a second length P2, Q2, or V2 from the rotating shaft insertion portion 651, 8651, or 9651 and which is engaged with the inner circumferential surface of the shaft-coupling hole 271, 871 or 971 so as to transmit the rotational force of the rotating shaft 65, 865, or 965 to the shaft bracket 27, 87, or 97 (see FIGS. 15A through 15D). The rotating shaft insertion portion 651, 8651, or 9651 can be coupled to the shaft bracket 27, 87 or 97 by means of the rotating-shaft-coupling member 26, 86, or 96.

The drive unit 10 can include the motor 5 including the stator 51 configured to generate a rotating field and the rotor 52 configured to be rotated due to the rotation of the rotating field, the rotor shaft 64, which is positioned between the rear cover 23 and the motor 5 and which is coupled at one end thereof to the rotor 52 so as to be rotated together with the rotor 52, and the power transmission unit 6 including the gear unit G configured to transmit the rotational movement of the rotor shaft 64 to the rotating shaft 65, 865, or 965.

The laundry treatment apparatus 100 can further include the protective cover 25 configured to protect the rotating shaft 65, 865, or 965 and the shaft bracket 27, 87, or 97 in the drum 2. The end of the rotating shaft 65, 865, or 965, which is inserted into the shaft-coupling hole 271, 871, or 971, can include the cover-positioning hole 653, which is centrally defined in the axial direction d, such that the protective cover 25 is threadedly coupled to the rotating shaft 65, 865, or 965 by means of the protective-coverfastening member 255. For example, the cover-positioning hole 653 can be configured to have the form of a screw hole.

Although the cover-positioning hole 653 is shown only in FIG. 13B for convenience of explanation, the cover-positioning hole, which is a screw hole, may also be formed at the same locations on the rotation shafts 865 and 865 shown in FIGS. 13C and 13D.

A portion of the inner circumferential surfaces 2711, 8711, and 9711 of each of the shaft-coupling holes 271, 871, and 971 can have a toothed or serrated form, and the outer circumferential surface of each of the rotating shaft insertion portions 651, 8651, and 9651 can also have a shape corresponding to the inner circumferential surface of each of the shaft-coupling holes 271, 871, and 971.

The length of each of the rotating shaft insertion portions 651, 8651, and 9651 in the axial direction can be greater than the length of each of the rotating shaft transmission portions 657, 8657, and 9657 in the axial direction. The lengths can be determined in consideration of the clamping force between the rotating-shaft-coupling member 26, 86, or 96 and the rotating shaft 65, 865, or 965.

FIGS. 13B and 14B illustrate an exemplary structure between the shaft bracket 27 and the rotating shaft 65. FIG. 15B illustrates an exemplary rotating shaft 65 shown in FIG. 14B in an enlarged view.

Referring to FIGS. 13B, 14B, and 15B, the rotating shaft 65 can include the rotating shaft insertion portion 651, which is provided in the axial direction over the first length P1 of one end 65a that is inserted into the shaft-coupling hole 271 and which is provided on the outer circumferential surface thereof with thread so as to be threadedly coupled, and the rotating shaft transmission portion 657, which is provided in the axial direction over the second length P2 from the rotating shaft insertion portion 651 and which is engaged with the inner circumferential surface of the shaft-coupling hole 271 so as to transmit the rotational force of the rotating shaft 65 to the shaft bracket 27.

The rotating shaft insertion portion 651 can be coupled to the shaft bracket 27 by means of the rotating-shaft-coupling member 26.

The rotating shaft transmission portion 657 can be engaged with the inner circumferential surface 2711 of the shaft-coupling hole 271. Here, the inner circumferential surface of the shaft-coupling hole 271 can be configured to have a toothed shape or a serrated shape. The rotating shaft transmission portion 657, which is engaged with the shaft-coupling hole 271, can also be configured to have a toothed shape or a serrated shape corresponding to the inner circumferential surface of the shaft-coupling hole 271. Because the rotating shaft transmission portion 657 must transmit the rotational force of the rotating shaft 65 to the shaft bracket 27 and must transmit the rotational force to the drum 2 via the rear cover 23, the rotating shaft transmission portion 657 can be configured to have a toothed shape or a serrated shape so as to efficiently transmit the rotational force without slipping.

The rotating shaft 65 can further include the rotating shaft flange 655, which is provided in the axial direction over a third length P3 from the rotating shaft transmission portion 657 and has an outside diameter greater than the outside diameter of the rotating shaft transmission portion 657. The rotating shaft flange 655 can be coupled to the rear surface of the shaft coupler 278. For example, because the outside diameter of the rotating shaft flange 655 is greater than the diameter of the inner circumferential surface of the shaft-coupling hole 271, the rotating shaft flange 655 can block the rotating shaft 65 from being inserted into the shaft-coupling hole 271 beyond a predetermined point. Accordingly, the rotating shaft flange 655 can serve to guide assembly of the rotating shaft 65 with the shaft bracket 27, thereby facilitating assembly.

The rotating shaft 65 can further include a power-transmitting connector 659, which extends in a direction toward the power transmission unit 6 from the rotating shaft flange 655 and is connected to the power transmission unit 6 in order to receive rotational force. Among the two ends 65a and 65b of the rotating shaft 65, the end 65b of the rotating shaft 65 that faces the power transmission unit 6 can be configured at a portion thereof to have a toothed shape or a serrated shape so as to be connected to the power transmission unit 6 and to receive rotational force therefrom.

Specifically, the portion of the rotating shaft 65 including the other end can be connected to the cage 67 of the power transmission unit 6.

As described above, the first length P1 of the rotating shaft insertion portion 651 in the axial direction may be greater than the second length P2 of the rotating shaft transmission portion 657 in the axial direction. This means that the length of the portion of the rotating shaft 65 that is inserted into the shaft-coupling hole and projects into the drum 2 is greater than the thickness of the shaft-coupling hole 271. Consequently, it is possible to reduce the extent to which the rotating shaft 65 is eccentrically movable with respect to the axis when the rotating shaft 65 is coupled to the rotating-shaft-coupling member 26.

The outside diameter of the rotating shaft insertion portion 651 in the radial direction of the rotating shaft 65 may be less than the outside diameter of the rotating shaft transmission portion 657 in the radial direction. The reason for this is to allow the rotating shaft 65 to more easily pass through the shaft-coupling hole 271 and to be assembled therewith.

The portion of the rotating shaft transmission portion 657 that is positioned close to the shaft-coupling hole 271 may be configured to be sloped. The reason for this is to allow the center of the rotating shaft 65 to be naturally aligned with the center of the shaft-coupling hole 271 by virtue of the sloped portion even when the center of the rotating shaft 65 is not aligned with the center of the shaft-coupling hole 271. Accordingly, it is possible to facilitate the assembly operation, compared to a conventional rotating shaft.

Accordingly, in an operation of assembling the rotating shaft 65 with the shaft bracket 27, the center of the rotating shaft 65 can first be aligned with the center of the shaft-coupling hole 271 by virtue of the sloped portion, and then the toothed or serrated portion of the rotating shaft transmission portion 657 can be engaged with the toothed or serrated portion of the inner circumferential surface 2711 of the shaft-coupling hole 271.

Comparing FIG. 15A with FIG. 15B, the total length MT from one end of the rotating shaft 465 to the rotating shaft flange 4655 is almost equal to the total length PT from one end of the rotating shaft 65 to the rotating shaft flange 655. However, it is noted that the first length P1 of the portion of the rotating shaft 65 that is engaged with the rotating-shaft-coupling member 26 is greater than the first length M1 of the conventional fastening bolt 46 when the conventional fastening bolt 46 is maximally engaged with the rotating shaft 665. The reason why a spacing distance M1a is present between the fastening bolt 46 and the rotating shaft 665 is because the thickness of the shaft bracket is considered, even although the shaft bracket is omitted.

Furthermore, it is noted that the inside diameter of the rotating-shaft-coupling member 26 externally coupled to the rotating shaft 65 is greater than the outside diameter of the body of the fastening bolt 46, which is inserted into the rotating shaft 465. Consequently, it is possible to increase the coupling strength and fastening force between the rotating-shaft coupling member 26 and the rotating shaft 65.

Accordingly, the increase in fastening force results in an increase in the clamping force between the shaft bracket 27 and the rotating shaft 65, thereby increasing a slip torque required to cause slippage between the rotating shaft 65 and the shaft bracket 27.

The laundry treatment apparatus 100 can further include the washer 28, which is positioned between the shaft bracket 27 and the rotating shaft 65 so as to improve the effect of coupling the rotating shaft 65 to the shaft bracket 27 and to uniformly distribute the force for clamping the shaft bracket 27 and the rotating shaft flange 655 to each other to the shaft bracket 27. To this end, the washer 28 can be a heat-treated washer.

As described above, the housing cover 63 can include the rotating shaft support 635, which extends toward the fixed panel 151 from the cover body 631, the rotating shaft through hole 632, which is defined through the rotating shaft support 635 and into which the rotating shaft 65 is inserted, and the rotating shaft bearings 638 and 639, which are provided at the rotating shaft support 635 so as to rotatably support the rotating shaft 65 in the rotating shaft through hole 632.

The rotating shaft bearings 638 and 639 can include the first bearing 638 and the second bearing 639, which are coupled to the rotating shaft support 635 and are positioned in the rotating shaft through hole 632. In some implementations, in order to block external air from being supplied to the rotating shaft bearings 638 and 639, the housing cover 63 can be provided with the seal 633, which is coupled to the rotating shaft support 635 so as to close the rotating shaft through hole 632.

Comparing FIG. 13A with FIG. 13B, it is noted that the volume occupied by the rotating shaft 65 and the shaft bracket 27 when the rotating shaft 65 and the shaft bracket 27 are coupled to each other is reduced more than in the case of the conventional rotating shaft 465.

When the distance between the second bearing 639 and the head end of the fastening bolt 46, which is coupled to the conventional rotating shaft, is denoted by T1 based on FIG. 13A, it is noted that the distance T2 in FIG. 13B between the second bearing 639 and the end of the rotating shaft 65 when the rotating-shaft-coupling member 26 is coupled to the rotating shaft 65 is less than the distance T1. For example, the volume occupied by the rotating shaft 65 and the shaft bracket 27 when the rotating shaft 65 and the shaft bracket 27 are coupled to each other by means of the rotating-shaft-coupling member 26 is reduced, thereby making the space compact.

Comparing the shaft bracket 27 shown in FIG. 13B with other shaft brackets 87 and 97, it is noted that the shaft bracket 27 has no portion which is changed in thickness or deformed near the shaft-coupling hole 271 in order to facilitate manufacture of the shaft bracket 27.

FIGS. 13C and 14C illustrate other exemplary structures between the shaft bracket 87 and the rotating shaft 865. FIG. 15C illustrates another exemplary rotating shaft 865 shown in FIGS. 13C and 14C in an enlarged view.

Referring to FIG. 15C, the rotating shaft 865 can include the rotating shaft insertion portion 8651, which is provided in the axial direction over the first length V1 from the end 865a of the rotating shaft 865 that is inserted into the shaft-coupling hole 871 and which is provided on the outer circumferential surface thereof with a thread so as to be threadedly coupled, and the rotating shaft transmission portion 8657, which is provided in the axial direction over the second length V2 from the rotating shaft insertion portion 8651 and which is engaged with the inner circumferential surface of the shaft-coupling hole 871 so as to transmit the rotational force of the rotating shaft 65 to the shaft bracket 87.

The rotating shaft insertion portion 8651 can be coupled to the shaft bracket 87 by means of the rotating-shaft-coupling member 86.

The rotating shaft transmission portion 8657 can be engaged with the inner circumferential surface 8711 of the shaft-coupling hole 871. Here, the inner circumferential surface 8711 of the shaft-coupling hole 871 can be configured to have a toothed or serrated form. The rotating shaft transmission portion 8657, which is engaged with the shaft-coupling hole 871, can also be configured to have a toothed or serrated form corresponding to the shaft-coupling hole 871. Because the rotating shaft transmission portion 8657 must transmit the rotational force of the rotating shaft 865 to the drum 2 via the shaft bracket 87 and the rear cover 23, the rotating shaft transmission portion 8657 can be configured to have the toothed or serrated form in order to efficiently transmit the rotational force without slipping.

The rotating shaft 865 can further include a rotating shaft flange 8655, which is provided in the axial direction over a third length V3 from the rotating shaft transmission portion 8657 and has an outside diameter larger than the outside diameter of the rotating shaft transmission portion 8657. The rotating shaft flange 8655 can be coupled to the rear surface of the shaft bracket 87 including the shaft-coupling hole 871. For example, because the outside diameter of the rotating shaft flange 8655 is greater than the diameter of the inner circumferential surface of the shaft-coupling hole 871 so as to block insertion of the rotating shaft 865 into the shaft-coupling hole 871 beyond a predetermined point, the rotating shaft flange 8655 can guide assembly of the rotating shaft 865, thereby facilitating assembly.

The rotating shaft 865 can further include a power-transmitting connector 8659, which extends toward the power transmission unit 6 from the rotating shaft flange 8655 and is connected to the power transmission unit 6 in order to receive the rotational force of the power transmission unit 6. A portion of the rotating shaft 865, which extends in the axial direction from the other end 865b of the rotating shaft 865, which faces the power transmission unit 6, can be configured to have a toothed or serrated form so as to be engaged with the power transmission unit 6 and to receive the rotational force of the power transmission unit 6.

Specifically, the portion of the rotating shaft 865 including the other end 865b can be connected to the cage 67 of the power transmission unit 6.

As described above, the first length V1 of the rotating shaft insertion portion 8651 in the axial direction can be greater than the second length V2 of the rotating shaft transmission portion 8657 in the axial direction. This means that the length of the portion of the rotating shaft 865 that projects into the drum 2 through the shaft-coupling hole 871 is greater than the thickness of the shaft-coupling hole 871. Accordingly, it is possible to reduce the extent to which the rotating shaft 865 is eccentrically movable with respect to the axis when the rotating shaft 865 is coupled to the rotating-shaft-coupling member 86.

Furthermore, the outside diameter of the rotating shaft insertion portion 8651 in the radial direction of the rotating shaft 865 may be smaller than the outside diameter of the rotating shaft transmission portion 8657 in the radial direction. The reason for this is to allow the rotating shaft 865 to easily pass through the shaft-coupling hole 871.

The portion of the rotating shaft transmission portion 8657 that is positioned close to the shaft-coupling hole 871 can be sloped. The reason for this is to enable the center of the rotating shaft 865 to be naturally aligned with the center of the shaft-coupling hole 871 by virtue of the sloped portion even when the center of the rotating shaft 865 is not aligned with the center of the shaft-coupling hole 871. Accordingly, it is possible to improve ease of assembly compared to a conventional rotating shaft.

Accordingly, in an operation of assembling the rotating shaft 865 with the shaft bracket 87, the center of the rotating shaft 865 may first be aligned with the center of the shaft-coupling hole 871 by virtue of the sloped portion of the rotating shaft transmission portion 8657, and then the toothed or serrated portion of the rotating shaft transmission portion 8657 may be engaged with the toothed or serrated portion of the inner circumferential surface 8711 of the shaft-coupling hole 871.

Comparing FIG. 15A with FIG. 15C, it is noted that the total length VT from one end of the rotating shaft 865 to the rotating shaft flange 8655 is greater than the total length MT of a conventional rotating shaft 465. Furthermore, it is noted that the first length V1 of the portion of the rotating shaft insertion portion 8651 that is engaged with the rotating-shaft-coupling member 86 is greater than the first length M1 of the conventional fastening bolt 46 when the conventional fastening bolt 46 is maximally engaged with the rotating shaft 665. Furthermore, it is noted that the outside diameter of the body of the fastening bolt 46, which is inserted into the rotating shaft 865 is greater than the inside diameter of the rotating-shaft-coupling member 86, which is externally engaged with the outer portion of the rotating shaft 865. Consequently, it is possible to increase the fastening strength and the fastening force between the rotating-shaft-coupling member 86 and the rotating shaft 865.

Accordingly, the increase in fastening force results in an increase in the clamping force between the shaft bracket 87 and the rotating shaft 865, thereby increasing the slip torque required to cause slippage between the rotating shaft 865 and the shaft bracket 87.

The laundry treatment apparatus 100 can further include the washer, which is positioned between the shaft bracket 87 and the rotating shaft 865 so as to improve the effect of coupling the rotating shaft 865 to the shaft bracket 87 and to uniformly distribute the clamping force between the shaft bracket 87 and the rotating shaft flange 8655 to the shaft bracket 87.

Comparing FIG. 13A with FIG. 13C, it is noted that, when the rotating shaft 865 is coupled to the shaft bracket 87, the volume occupied by the rotating shaft 865 and the shaft bracket 87 increases compared to the case of a conventional rotating shaft 465.

When the distance T1 between the second bearing 639 and the head end of the fastening bolt 46, which is engaged with the conventional rotating shaft 465, is denoted by T1, it is noted that the distance T2 between the second bearing 639 and the end of the rotating shaft 865 when the rotating-shaft-coupling member 86 is engaged with the rotating shaft 865 is greater than the distance T1.

It is noted that the second length V2 in FIG. 15C is greater than the second length P2 in FIG. 15B. This means that the length of the inner circumferential surface of the shaft-coupling hole 871 corresponding to the rotating shaft transmission portion 8657 in FIG. 15C in the axial direction is greater than the length of the inner circumferential surface of the shaft-coupling hole 271 and that the contact area between the rotating shaft transmission portion 8657 and the shaft-coupling hole 871 increases. Consequently, it is possible to more efficiently transmit the rotational force of the rotating shaft 865 to the shaft bracket 87 via the rotating shaft transmission portion 8657.

Furthermore, it is noted that the third length V3 in FIG. 15C is also greater than the third length P3 in FIG. 15B. The third length V3 of the rotating shaft flange 8655 can increase in proportion to the increase in the second length V2 of the rotating shaft transmission portion 8657, thereby making it possible to endure higher torsion.

However, because both the second length V2 and the third length V3 increase, the length of the rotating shaft 865 may increase, thereby increasing the volume occupied by the rotating shaft 865. In some implementations, in order to minimize the increase in the volume, a portion of the rotating shaft flange 8655 can be inserted into the shaft-coupling hole 871. For example, the fourth length V4 of a portion of the rotating shaft flange 8655, which corresponds to a predetermined distance from the rotating shaft transmission portion 8657, can be inserted into the shaft-coupling hole 871.

To this end, the inner circumferential surface of the shaft-coupling hole 871 can be stepped so as to correspond to the outside diameters of the rotating shaft transmission portion 8657 and the rotating shaft flange 8655. Consequently, when the rotating shaft 865 is inserted into the shaft-coupling hole 871, the rotating shaft transmission portion 8657 can be inserted into the shaft-coupling hole 871, and a portion of the rotating shaft flange 8655 can then be inserted into the shaft-coupling hole 871.

For example, the length of the inner circumferential surface 8711 of the shaft-coupling hole 871 in the axial direction may be greater than the second length V2 but may be less than the sum of the second length V2 and the third length V3.

The inner circumferential surface of the portion of the shaft-coupling hole 871 corresponding to the second length V2 may be configured to have a toothed or serrated form so as to correspond to the rotating shaft transmission portion 8657. Furthermore, the inner circumferential surface of the shaft-coupling hole 871 corresponding to the fourth length V4 may be configured so as to correspond to the outside diameter of the rotating shaft flange 8655.

The thickness of the shaft bracket 87 corresponding to the shaft-coupling hole 871 may be greater than thickness of other portions of the shaft bracket 87.

FIGS. 13D and 14D illustrate another exemplary structure between the shaft bracket 97 and the rotating shaft 965. FIG. 15D illustrates another exemplary rotating shaft 965 shown in FIGS. 13D and 14D in an enlarged view.

Referring to FIG. 15D, the rotating shaft 965 can include the rotating shaft insertion portion 9651, which is provided in the axial direction over a first length Q1 from the end 965a of the rotating shaft 965 that is inserted into the shaft-coupling hole 971 and which is provided at the outer circumferential surface thereof with a thread so as to be threadedly coupled, and the rotating shaft transmission portion 9657, which is provided in the axial direction over a second length Q2 from the rotating shaft insertion portion 9651 and which is engaged with the inner circumferential surface of the shaft-coupling hole 971 so as to transmit the rotational force of the rotating shaft 65 to the shaft bracket 97.

The rotating shaft insertion portion 9651 can be coupled to the shaft bracket 97 by means of the rotating-shaft-coupling member 96.

The rotating shaft transmission portion 9657 can be engaged with the inner circumferential surface 9711 of the shaft-coupling hole 971. The inner circumferential surface 9711 of the shaft-coupling hole 971 can be configured to have a toothed or serrated form. Accordingly, the rotating shaft transmission portion 9657, which is engaged with the shaft-coupling hole 971, can also be configured to have a toothed or serrated form corresponding to the inner circumferential surface 9711 of the shaft-coupling hole 971. Because the rotating shaft transmission portion 9657 must transmit the rotational force of the rotating shaft 965 to the drum 2 via the shaft bracket 97 and the rear cover 23, the rotating shaft transmission portion 9657 can be configured to have a toothed or serrated form in order to efficiently transmit the rotational force without slipping.

The rotating shaft 965 can further include a rotating shaft flange 9655, which is provided in the axial direction over a third length Q3 between one end 965a and the other end 965b of the rotating shaft 965 and which has an outside diameter greater than the outside diameter of the rotating shaft transmission portion 9657, and a rotating shaft connection portion 9657a, which is positioned between the rotating shaft flange 9655 and the rotating shaft transmission portion 9657 and has a fourth length Q4. The reason why the rotating shaft connection portion 9657a is provided is to allow the assembly to be more easily performed.

Unlike the rotating shaft depicted in FIGS. 15B and 15C, the rotating shaft connection portion 9657a, which is configured to have a smooth cylindrical shape and the fourth length Q4, can be further provided between the rotating shaft transmission portion 9657 and the rotating shaft flange 9655.

The outside diameter of the rotating shaft connection portion 9657a may be less than the outside diameter of the rotating shaft flange 9655 but may be equal to or larger greater the outside diameter of the rotating shaft insertion portion 9651.

The rotating shaft 965 can further include a power transmission connector 9659, which extends towards the power transmission unit 6 from the rotating shaft flange 9655 and is connected to the power transmission unit 6 in order to receive the rotational force of the power transmission unit 6. A portion of the rotating shaft 965, which extends in the axial direction from the other end 965b of the rotating shaft 965, which faces the power transmission unit 6, can be configured to have a toothed or serrated form in order to receive the rotational force.

Specifically, the portion of the rotating shaft 965 including the other end can be connected to the cage 67 of the power transmission unit 6.

As described above, the first length Q1 of the rotating shaft insertion portion 9651 in the axial direction may be greater than the second length Q2 of the rotating shaft transmission portion 9657 in the axial direction. This means that the length of the portion of the rotating shaft 965 that projects into the drum 2 through the shaft-coupling hole 971 is greater than the thickness of the shaft-coupling hole 971. Consequently, it is possible to reduce the extent to which the rotating shaft 965 is eccentrically movable with respect to the axis when the rotating shaft 965 is coupled to the rotating-shaft-coupling member 96.

Furthermore, the outside diameter of the rotating shaft insertion portion 9651 in the radial direction of the rotating shaft 965 may be smaller than the outside diameter of the rotating shaft transmission portion 9657 in the radial direction. The reason for this is to allow the rotating shaft 965 to easily pass through the shaft-coupling hole 971 when the rotating shaft 965 is fitted through the shaft-coupling hole 971.

The portion of the rotating shaft transmission portion 9657 that is positioned close to the shaft-coupling hole 971 can be sloped. The reason for this is to allow the center of the rotating shaft 965 to be naturally aligned with the center of the shaft-coupling hole 971 by virtue of the sloped portion even when the center of the rotating shaft 965 is not aligned with the center of the shaft-coupling hole 971. Accordingly, it is possible to improve ease of an assembly operation compared to a conventional rotating shaft.

Accordingly, in an operation of assembling the rotating shaft 965 with the shaft bracket 97, the center of the rotating shaft 965 may first be aligned with the center of the shaft-coupling hole 971 by virtue of the sloped portion of the rotating shaft transmission portion 9657, and then the toothed or serrated portion of the rotating shaft transmission portion 9657 may be engaged with the toothed or serrated portion of the inner circumferential surface 9711 of the shaft-coupling hole 971.

Referring to FIG. 14D, the shaft-coupling hole 971 can include a pipe-shaped shaft-coupling-hole extension 9712, which is bent at the inner circumferential surface 9711 of the shaft-coupling hole 971 and axially extends toward the drive unit 10.

Consequently, the shaft-coupling hole 971 can axially extend by virtue of the shaft-coupling-hole extension 9712.

The inner circumferential surface 9711 of the shaft-coupling hole 971, which corresponds to the shaft bracket 97, can be configured to have a toothed or serrated form so as to correspond to the rotating shaft transmission portion 9657, and the inner circumferential surface of the shaft-coupling-hole extension 9712, that is, the inner circumferential surface of the portion, which is bent at the inner circumferential surface 9711 of the shaft-coupling hole 971 and extends therefrom, can be configured to have a smooth surface corresponding to the rotating shaft connection portion 9657a.

The length of the shaft-coupling-hole extension 9712 can be the same as the fourth length Q4 of the rotating shaft connection portion 9657a. Accordingly, when the rotating shaft 965 is inserted into the shaft-coupling hole 971, the rotating shaft transmission portion 9657 is engaged with the shaft-coupling hole 971 such that the shaft-coupling-hole extension 9712 corresponds to the rotating shaft connection portion 9657a. At this time, the rotating shaft flange 9655 can catch on the free end of the shaft-coupling-hole extension 9712, thereby blocking deeper insertion of the rotating shaft 965.

For example, the shaft-coupling-hole extension 9712 can serve as a stopper configured to prevent deeper insertion of the rotating shaft flange 9655. In some implementations, in order to insert the rotating shaft 965 into the shaft-coupling hole 971, the rotating shaft 965 must first be inserted into the shaft-coupling-hole extension 9712. At this time, the sloped portion of the rotating shaft transmission portion 9657 can serve to align the center of the rotating shaft 965 with the center of the shaft-coupling-hole extension 9712. Subsequently, the toothed portion or the serrated portion of the rotating shaft transmission portion 9657 can be engaged with the toothed portion or the serrated portion of the inner circumferential surface of the shaft-coupling hole 971, thereby improving ease of an assembly operation compared to the implementations depicted in FIGS. 13A, 13B, and 13C.

In this case, because the length of the rotating shaft 965 may increase due to the shaft-coupling-hole extension 9712, the volume occupied by the rotating shaft 965 and the shaft bracket 97 when the rotating shaft 965 and the shaft bracket 97 are coupled to each other may increase compared to the implementation shown in FIG. 13B. However, the fastening force and the fastening strength of the rotating-shaft-coupling member 96 and the rotating shaft 965 are expected to be superior to the conventional rotating shaft shown in FIG. 13A.

Comparing FIG. 15A with FIG. 15D, it is noted that the total length QT from the one end of the rotating shaft 965 to the rotating shaft flange 9655 is greater than the total length MT of a conventional rotating shaft 465. Furthermore, it is noted that the first length Q1 of the portion of the rotating shaft insertion portion 9651 that is engaged with the rotating-shaft-coupling member 96 is greater than the first length M1 of the conventional fastening bolt 46 when the conventional fastening bolt 46 is maximally engaged with the rotating shaft 665. Furthermore, it is noted that the inside diameter of the rotating-shaft-coupling member 96, which is externally engaged with the outer portion of the rotating shaft 965, is larger than the outside diameter of the body of the fastening bolt 46, which is inserted into the rotating shaft 965. Consequently, it is possible to increase the fastening strength and the fastening force between the rotating-shaft-coupling member 96 and the rotating shaft 965.

Accordingly, the increase in fastening force results in an increase in the clamping force between the shaft bracket 97 and the rotating shaft 965, thereby increasing the slip torque required to cause slippage between the rotating shaft 965 and the shaft bracket 97.

The laundry treatment apparatus 100 can further include a washer, which is positioned between the shaft bracket 97 and the rotating shaft 965 so as to improve the effect of coupling the rotating shaft 965 to the shaft bracket 97 and to uniformly distribute the clamping force between the shaft bracket 97 and the rotating shaft flange 9655 to the shaft bracket 97.

Comparing FIG. 13A with FIG. 13D, it is noted that, when the rotating shaft 965 is coupled to the shaft bracket 97, the volume occupied by the rotating shaft 965 and the shaft bracket 97 increases compared to the case of the conventional rotating shaft 465.

When the distance T1 between the second bearing 639 and the head end of the fastening bolt 46, which is engaged with the conventional rotating shaft 465, is denoted by T1, it is noted that the distance T2 between the second bearing 639 and the end of the rotating shaft 965 when the rotating-shaft-coupling member 96 is engaged with the rotating shaft 965 is greater than the distance T1.

It is noted that the sum of the second length Q2 and the fourth length Q4 in FIG. 15D is greater than the sum of the second length V2 and the fourth length V4 in FIG. 15C. This means that the length of the inner circumferential surface of the shaft-coupling hole 971 corresponding to the rotating shaft transmission portion 9657 and the rotating shaft connection portion 9657a in FIG. 15D in the axial direction is greater than the length of the inner circumferential surface of the shaft-coupling hole 871, and that the contact area between the rotating shaft transmission portion 9657 and the shaft-coupling hole 971 increases. Consequently, it is possible to more efficiently transmit the rotational force of the rotating shaft 865 to the shaft bracket 97 via the rotating shaft transmission portion 9657.

FIGS. 14A, 14B, 14C, and 14B illustrate another exemplary shaft bracket, which are different from the shaft bracket 27 shown in FIGS. 10A and 10B. FIGS. 10A and 10B illustrate a circular shaft bracket 27, whereas FIGS. 14A, 14B, 14C, and 14D illustrate a hexagonal shaft bracket.

When the shaft brackets 27, 87, and 97 are coupled to the rear cover 23, all of the shaft brackets 27, 87, and 97 project into the drum 2. The reason for this is to minimize the volume occupied by the shaft brackets 27, 87, and 97 when the shaft brackets 27, 87, and 97 are coupled to the rear cover 23 behind the drum 2.

The shaft brackets 27, 87, and 97 can have formed therein respective shaft-coupling holes 271, 871, and 971, which are respectively positioned in the centers of the shaft brackets 27, 87, and 97 and into which the rotating shafts 65, 865, and 965 are respectively inserted. Each of shaft bracket flanges 275, 875, and 975, which are provided in the radially outward direction of the shaft-coupling holes 271, 871, and 971, can include a plurality of rear-cover-coupling holes 272, 872, or 972 for coupling to the rear cover 23.

The rear cover 23 can include the plurality of shaft-bracket-coupling holes 232, which are defined so as to correspond to the plurality of rear-cover-coupling holes 272, 872, or 972 and are arranged around the rear cover through hole 231. Consequently, the rear cover 23 and the shaft bracket 27 can be coupled to each other by means of a bracket-fastening member after the shaft-bracket-coupling holes 232 are respectively aligned with the rear-cover-coupling holes 272.

First, the laundry treatment apparatus can reduce damages on laundry caused by a coupling member for coupling the drum to the drum-rotating shaft configured to rotate the drum during rotation of the drum.

Second, the laundry treatment apparatus can reduce damages on the bottom surface of the drum and various assembly members for coupling the bottom surface of the drum to the drum-rotating shaft caused by laundry during rotation of the drum.

Third, the laundry treatment apparatus can prevent a damaged assembly member from being rusted by wet laundry.

Fourth, the laundry treatment apparatus can block the exposure of a structure for assembling the drum with the drum-rotating shaft configured to rotate the drum and contact with laundry during rotation of the drum.

Fifth, the laundry treatment apparatus can increase the fastening force between the shaft bracket (or a shaft bushing) and the rotating shaft.

Sixth, the laundry treatment apparatus can facilitate assembly of the shaft bracket with the rotating shaft.

Seventh, the laundry treatment apparatus can block slippage between the shaft bracket and the rotating shaft.

Eighth, the laundry treatment apparatus can increase the rigidity of the shaft bracket.

What is claimed is:

1. A laundry treatment apparatus comprising:
a drive unit including a rotating shaft;
a drum configured to be rotated by the rotating shaft and receive laundry and including a cylindrical drum body and a rear cover, the rear cover defining a rear surface of the drum body and a rear cover through hole in an axial direction of the rotating shaft; and
a shaft bracket that (i) is coupled to the rear cover and the rotating shaft, (ii) covers the rear cover through hole, (iii) is configured to transmit rotational force of the rotating shaft to the drum, and (iv) defines a shaft-coupling hole in the axial direction, wherein the rotating shaft is inserted into the shaft-coupling hole, projected into an inside of the drum, and coupled to the shaft bracket by a rotating-shaft-fastening member, and
wherein the rotating shaft comprises:
a rotating shaft transmission portion configured to engage with an inner circumferential surface of the shaft-coupling hole to thereby transmit the rotational force of the rotating shaft to the shaft bracket,
a rotating shaft insertion portion (i) provided at a first end of the rotating shaft that is inserted into the shaft-coupling hole, (ii) extending to a first predetermined length in the axial direction, and (iii) providing a thread at an outer circumferential surface,
wherein the rotating shaft transmission portion extends from the rotating shaft insertion portion to a second predetermined length in the axial direction, and
wherein the rotating shaft insertion portion is coupled to the shaft bracket by the rotating-shaft-fastening member.

2. The laundry treatment apparatus of claim 1, wherein at least a portion of the inner circumferential surface of the shaft-coupling hole has a toothed or serrated form, and the outer circumferential surface of the rotating shaft insertion portion has a shape corresponding to the inner circumferential surface of the shaft-coupling hole.

3. The laundry treatment apparatus of claim 2, wherein a length of the rotating shaft insertion portion is greater than a length of the rotating shaft transmission portion in the axial direction.

4. The laundry treatment apparatus of claim 2, wherein an outer diameter of the rotating shaft insertion portion is less than an outer diameter of the rotating shaft transmission portion in a radial direction of the rotating shaft.

5. The laundry treatment apparatus of claim 2, wherein the rotating shaft further comprises a rotating shaft flange extending from the rotating shaft transmission portion to a third predetermined length in the axial direction, an outer diameter of the rotating shaft flange being greater than an outer diameter of the rotating shaft transmission portion.

6. The laundry treatment apparatus of claim 5, wherein the outer diameter of the rotating shaft flange is greater than a diameter of the inner circumferential surface of the shaft-coupling hole so as to block insertion of the rotating shaft beyond a predetermined point based on the rotating shaft being inserted into the shaft-coupling hole.

7. The laundry treatment apparatus of claim 5, wherein the inner circumferential surface of the shaft-coupling hole is stepped so as to correspond to the rotating shaft transmission portion and the rotating shaft flange such that, based on the rotating shaft being inserted into the shaft-coupling hole, the rotating shaft transmission portion is inserted into the shaft-coupling hole and a portion of the rotating shaft flange is inserted into the shaft-coupling hole so as to block the rotating shaft to be further inserted.

8. The laundry treatment apparatus of claim 7, wherein a length of the shaft-coupling hole in the axial direction is (i) greater than a length of the rotating shaft transmission portion and (ii) less than a sum of the length of the rotating shaft transmission portion and a length of a portion of the rotating shaft flange.

9. The laundry treatment apparatus of claim 2, wherein the rotating shaft further comprises:
a rotating shaft flange that extends in the axial direction over a third predetermined length between the first end of the rotating shaft and a remaining end of the rotating shaft and that has an outer diameter greater than an outer diameter of the rotating shaft, and a rotating shaft connection portion provided between the rotating shaft flange and the rotating shaft transmission portion.

10. The laundry treatment apparatus of claim 9, wherein an outer diameter of the rotating shaft connection portion is (i) less than the outer diameter of the rotating shaft flange and (ii) equal to or greater than an outer diameter of the rotating shaft insertion portion.

11. The laundry treatment apparatus of claim 10, wherein the shaft-coupling hole includes a shaft-coupling-hole extension that protrudes at a predefined angle from the inner circumferential surface of the shaft-coupling hole and that extends in the axial direction toward the drive unit such that, based on the rotating shaft being inserted into the shaft-coupling hole, the shaft-coupling-hole extension is configured to block insertion of the rotating shaft flange into the shaft-coupling hole.

12. The laundry treatment apparatus of claim 1, wherein, based on the shaft bracket being coupled to the rear cover, a portion of the shaft bracket projects into the inside of the drum through the rear cover through hole.

13. The laundry treatment apparatus of claim 12, wherein the shaft bracket comprises:

a ring-shaped shaft coupler defining the shaft-coupling hole, a shaft bracket flange radially spaced apart from a center of the shaft-coupling hole and coupled to the rear cover, and a shaft bracket sloping portion disposed between the shaft coupler and the shaft bracket flange and connected to the shaft coupler and the shaft bracket flange, and wherein, based the shaft bracket flange being coupled to the rear cover, the shaft coupler is inserted into the inside of the drum through the rear cover through hole.

14. The laundry treatment apparatus of claim 1, further comprising a protective cover coupled to the rear cover so as to block the shaft bracket and the rotating shaft from contacting the laundry.

15. The laundry treatment apparatus of claim 14, wherein the protective cover is coupled to the rotating shaft.

16. The laundry treatment apparatus of claim 15, wherein the protective cover is coupled to the rotating shaft by a protective-cover-fastening member.

17. The laundry treatment apparatus of claim 14, wherein the shaft bracket defines shaft-coupling hole in the axial direction so as to be coupled to the rotating shaft, and wherein the rotating shaft is (i) coupled to the shaft bracket through the shaft-coupling hole and (ii) inserted into the inside of the drum.

18. The laundry treatment apparatus of claim 14, wherein an outer diameter of the protective cover is greater than an inner diameter of the rear cover through hole.

19. The laundry treatment apparatus of claim 14, wherein an outer diameter of the shaft bracket is greater than an inner diameter of the rear cover through hole.

* * * * *